United States Patent
Myhre et al.

(10) Patent No.: US 11,083,028 B2
(45) Date of Patent: Aug. 3, 2021

(54) COORDINATED SELECTION OF USER PLANE FUNCTIONS IN CORE AND RADIO ACCESS NETWORKS

(71) Applicant: Telefonaktiebolaget LM Ericsson (publ), Stockholm (SE)

(72) Inventors: Elena Myhre, Järfälla (SE); Göran Hall, Mölndal (SE); Jan Backman, Kärna (SE); Jari Vikberg, Järna (SE); Mattias Wahlqvist, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/762,128

(22) PCT Filed: Feb. 8, 2018

(86) PCT No.: PCT/EP2018/053135
§ 371 (c)(1),
(2) Date: Mar. 22, 2018

(87) PCT Pub. No.: WO2018/177638
PCT Pub. Date: Oct. 4, 2018

(65) Prior Publication Data
US 2019/0075606 A1 Mar. 7, 2019

Related U.S. Application Data

(60) Provisional application No. 62/479,757, filed on Mar. 31, 2017.

(51) Int. Cl.
*H04W 76/12* (2018.01)
*H04W 48/18* (2009.01)
(Continued)

(52) U.S. Cl.
CPC ............ *H04W 76/12* (2018.02); *H04L 45/04* (2013.01); *H04L 45/64* (2013.01); *H04L 69/324* (2013.01);
(Continued)

(58) Field of Classification Search
CPC ....... H04L 12/715; H04L 45/64; H04L 45/04; H04L 69/324; H04W 36/14; H04W 88/16;
(Continued)

(56) References Cited

U.S. PATENT DOCUMENTS 7,162,467 B2 * 1/2007 Eshleman ............... H04L 29/06
8,072,900 B2 * 12/2011 Antal ..................... H04L 45/00
                                                                 370/252
(Continued)

OTHER PUBLICATIONS

Author Unknown, "Technical Specification Group Core Network and Terminals; SIP-I based circuit-switched core network; Stage 2 (Release 14)," Technical Specification 23.231, Version 14.0.0, 3GPP Organizational Partners, Mar. 2017, 73 pages.
(Continued)

*Primary Examiner* — Nishant Divecha
(74) *Attorney, Agent, or Firm* — Withrow & Terranova, PLLC

(57) ABSTRACT

Systems and methods are disclosed herein for coordinated selection of a User Plane Function (UPF) in a core network and a Packet Processing Function (PPF) in a radio access network. In some embodiments, a method of operation of network node of a cellular communications network to enable coordinated UPF and PPF selection comprises receiving information indicative of a UPF selected for a protocol data unit session of a wireless device, where the UPF is part of a core network of the cellular communications network. The method further comprises selecting a PPF for the protocol data unit session of the wireless device based on
(Continued)

Initial attach – uncoordinated user plane function selection according to prior art the information indicative of the UPF selected for the protocol data unit session of the wireless device, where the PPF is part of a radio access network of the cellular communications network. In this manner, an optimal routing of user data traffic can be achieved.

14 Claims, 15 Drawing Sheets

(51) Int. Cl.
*H04W 72/04* (2009.01)
*H04W 36/14* (2009.01)
*H04L 12/715* (2013.01)
*H04W 36/00* (2009.01)
*H04L 29/08* (2006.01)
*H04W 88/16* (2009.01)
*H04W 84/04* (2009.01)
*H04W 88/02* (2009.01)

(52) U.S. Cl.
CPC ....... *H04W 36/0033* (2013.01); *H04W 48/18* (2013.01); *H04W 72/04* (2013.01); *H04W 36/14* (2013.01); *H04W 84/042* (2013.01); *H04W 88/02* (2013.01); *H04W 88/16* (2013.01)

(58) Field of Classification Search
CPC . H04W 76/12; H04W 36/0033; H04W 48/18; H04W 72/04; H04W 84/042; H04W 88/02
See application file for complete search history.

(56) References Cited

U.S. PATENT DOCUMENTS

| | | | |
|---|---|---|---|
| 8,447,304 B2 * | 5/2013 | Morinaga | H04W 28/08 370/245 |
| 9,344,949 B2 * | 5/2016 | Mufti | H04W 40/02 |
| 2008/0043666 A1 * | 2/2008 | Tamura | H04W 36/32 370/328 |
| 2009/0019180 A1 | 1/2009 | Aso et al. | |
| 2010/0004014 A1 | 1/2010 | Coulombe | |
| 2010/0061301 A1 | 3/2010 | Antal et al. | |
| 2012/0113809 A1 | 5/2012 | Cortes Gomez | |
| 2012/0324083 A1 | 12/2012 | Lee | |
| 2016/0338039 A1 | 11/2016 | Van Der Velde et al. | |
| 2017/0078153 A1 | 3/2017 | Zhang et al. | |
| 2017/0085628 A1 | 3/2017 | Mahindra et al. | |
| 2017/0086049 A1 * | 3/2017 | Vrzic | H04L 45/306 |
| 2018/0035351 A1 | 2/2018 | Kodaypak | |
| 2018/0041436 A1 | 2/2018 | Zhang | |
| 2018/0220339 A1 | 8/2018 | Arora et al. | |
| 2018/0294994 A1 | 10/2018 | Yin et al. | |
| 2019/0191309 A1 | 6/2019 | Kweon et al. | |

OTHER PUBLICATIONS

Author Unknown, "Technical Specification Group Services and System Aspects; System Architecture for the 5G System; Stage 2 (Release 15)," Technical Specification 23.501, Version 0.3.1, 3GPP Organizational Partners, Mar. 2017, 97 pages.
Westerberg, Erik, "4G/5G Architecture: How a Split Can Make the Difference," Ericsson Technology Review, vol. 93, Jul. 22, 2016, 16 pages.
International Search Report and Written Opinion for International Patent Application No. PCT/EP2018/053135, dated Jun. 7, 2018, 19 pages.
International Search Report and Written Opinion for International Patent Application No. PCT/EP2018/054101, dated May 15, 2018, 17 pages.
Non-Final Office Action for U.S. Appl. No. 15/761,276, dated Sep. 19, 2019, 29 pages.
Non-Final Office Action for U.S. Appl. No. 15/761,276, dated Aug. 28, 2020, 45 pages.
Final Office Action for U.S. Appl. No. 15/761,276, dated Feb. 21, 2020, 34 pages.
Advisory Action for U.S. Appl. No. 15/761,276, dated May 6, 2020, 7 pages.
Notification of Reason for Refusal for Korean Patent Application No. 10-2019-7028687, dated Jul. 10, 2020, 13 pages.
Examination Report for European Patent Application No. 18706998.4, dated Aug. 5, 2020, 3 pages.
Final Office Action for U.S. Appl. No. 15/761,276, dated Mar. 26, 2021, 46 pages.
Advisory Action for U.S. Appl. No. 15/761,276, dated Jun. 15, 2021, 3 pages.

* cited by examiner

Uncoordinated UPF and PPF selection 5G architecture

*Initial attach – uncoordinated user plane function selection according to prior art*

Initial attach – uncoordinated user plane function selection according to prior art First embodiment for coordinated initial selection of user plane functions Initial attach — uncoordinated user plane function selection according to prior art

*First embodiment for coordinated reselection of user plane functions*

*First embodiment for coordinated reselection of user plane functions*

Second embodiment for coordinated initial selection of user plane functions

Second embodiment for coordinated initial selection of user plane functions

Second embodiment for coordinated reselection of user plane functions

Second embodiment for coordinated reselection of user plane functions

COORDINATED SELECTION OF USER PLANE FUNCTIONS IN CORE AND RADIO ACCESS NETWORKS

RELATED APPLICATIONS

This application is a 35 U.S.C. § 371 national phase filing of International Application No. PCT/EP2018/053135, filed Feb. 8, 2018, which claims the benefit of provisional patent application Ser. No. 62/479,757, filed Mar. 31, 2017, the disclosures of which are hereby incorporated herein by reference in their entireties.

TECHNICAL FIELD

The present disclosure relates to selection of User Plane (UP) functions in a core network and a Radio Access Network (RAN) of a cellular communications network.

BACKGROUND

In current Long Term Evolution (LTE) networks, the Mobility Management Entity (MME) selects which Serving Gateway (S-GW)/Packet Data Network (PDN) Gateway (P-GW) that should be used by a specific User Equipment device (UE). In an LTE Radio Access Network (RAN), no such selection is done, as the User Plane (UP) processing is integrated in the enhanced or evolved Node B (eNB) handling the Control Plane (CP) termination for the UE.

For Fifth Generation (5G), the situation gets more complicated:
- The Session Management Function (SMF) in the 5G Core Network (5GC) can select one or several UP Functions (UPFs). Note that the 5GC is also referred to herein as a Next Generation (NG) Core Network (NGC or NG-CN).
- The function handling the CP termination (e.g., Radio Control Function (RCF)) in the 5G RAN might select one or several UP handling functions (e.g., Packet Processing Functions (PPFs)). The 5G RAN is also referred to herein as a NG-RAN.
- For each Protocol Data Unit (PDU) session, a pair of UPF and PPF functions is selected as there is a single tunnel between these functions.
- There are two separate discussions about deployment of functionality as following:
  a) distribution of Core Network (CN) UPF functionality further out in the network, and
  b) centralization of RAN functionality, both RCF and PPF, higher up in the network.

The above assumes a RAN implementation where the function handling the CP and the one handling the packet processing (i.e., UP) are logically distinct, to enable flexibility and improved scalability. If the CP and UP are not logically separate, it is assumed there is no selection to be made (note that 'logically separate' still applies even if the PPF and RCF are co-sited, as in principle one RCF could select a PPF that is not the one(s) it is co-sited with).

5G results in many new technical problems that need to be solved, one of which is UPF and PPF selection. As such, there is a need for systems and methods for UPF and PPF selection, particularly in a 5G network.

SUMMARY

Systems and methods are disclosed herein for coordinated selection of a User Plane (UP) Function (UPF) in a core network and a Packet Processing Function (PPF) in a Radio Access Network (RAN). In some embodiments, a method of operation of network node of a cellular communications network to enable coordinated UPF and PPF selection comprises receiving information indicative of a UPF selected for a Protocol Data Unit (PDU) session of a wireless device, where the UPF is part of a Core Network (CN) of the cellular communications network. The method further comprises selecting a PPF for the PDU session of the wireless device based on the information indicative of the UPF selected for the PDU session of the wireless device, where the PPF is part of a RAN of the cellular communications network. In this manner, an optimal routing of user data traffic can be achieved, thereby avoiding delays and extra transport costs.

In some embodiments, the information indicative of the UPF comprises UPF pool information for the UPF or UPF information for the UPF. In some embodiments, the information indicative of the UPF comprises information that identifies a name and/or location of the UPF. In some embodiments, the information indicative of the UPF comprises a UPF pool identity for the UPF, a UPF name of the UPF, a UPF address of the UPF, and/or a UPF location of the UPF.

In some embodiments, selecting the PPF comprises selecting the PPF for the PDU session of the wireless device based on the information indicative of the UPF selected for the PDU session of the wireless device and one or more criteria associated with the RAN.

In some embodiments, selecting the PPF comprises selecting the PPF for the PDU session of the wireless device based on the information indicative of the UPF selected for the PDU session of the wireless device and a defined mapping of the information that identifies the UPF selected for the PDU session of the wireless device to one or more available PPFs including the PPF.

In some embodiments, selecting the PPF comprises selecting the PPF for the PDU session of the wireless device by locally translating the information indicative of the UPF selected for the PDU session of the wireless device to the PPF based on a defined mapping of the information that identifies the UPF selected for the PDU session of the wireless device to one or more available PPFs including the PPF.

In some embodiments, selecting the PPF comprises selecting the PPF for the PDU session of the wireless device by querying a separate database using the information indicative of the UPF selected for the PDU session of the wireless device to thereby translate the information indicative of the UPF selected for the PDU session of the wireless device to the PPF based on a defined mapping.

In some embodiments, the method further comprises sending, to the PPF, a message comprising a transport address and tunneling endpoint identifier of the UPF, and sending, to a core network node, a message comprising a transport address and tunneling endpoint identifier of the PPF to thereby enable establishment of a UP tunnel for the PDU session between the UPF and the PPF.

In some embodiments, receiving the information indicative of the UPF selected for the PDU session of the wireless device and selecting the PPF for the PDU session of the wireless device based on the information indicative of the UPF selected for the PDU session of the wireless device are performed during an initial attachment procedure.

In some embodiments, receiving the information indicative of the UPF selected for the PDU session of the wireless device comprises receiving, from an Access and Mobility Management Function (AMF), an initial context setup request comprising the information indicative of the UPF, a transport address of the UPF, and a Tunnel Endpoint Identifier (TEID) of the UPF. In some embodiments, the method further comprises sending, to the PPF, an initial User Equipment device (UE) attach message comprising the transport address and the TEID of the UPF, and sending, to the AMF, an initial context setup response comprising a transport address and TEID of the PPF to thereby enable establishment of a UP tunnel for the PDU session between the UPF and the PPF.

In some embodiments, receiving the information indicative of the UPF selected for the PDU session of the wireless device and selecting the PPF for the PDU session of the wireless device based on the information indicative of the UPF selected for the PDU session of the wireless device are performed during a reselection or reallocation procedure. In some embodiments, receiving the information indicative of the UPF selected for the PDU session of the wireless device comprises receiving, from an AMF, an initial context modification request comprising the information indicative of the UPF, a transport address of the UPF, and a TEID of the UPF. In some embodiments, the method further comprises sending, to the PPF, an establishment request comprising the transport address and the TEID of the UPF, and sending, to the AMF, a context modification response comprising a transport address and TEID of the PPF to thereby enable establishment of a UP tunnel for the PDU session between the UPF and the PPF.

In some embodiments, the network node is a Radio Control Function (RCF), and the PPF is logically separated from the RCF, the PPF is physically and logically separated from the RCF, or the PPF is physically and logically co-located with the RCF.

Embodiments of a network node are also disclosed. In some embodiments, a network node of a cellular communications network for enabling coordinated UPF and PPF selection is adapted to receive information indicative of a UPF selected for a PDU session of a wireless device, the UPF being part of a CN of the cellular communications network. The network node is further adapted to select a PPF for the PDU session of the wireless device based on the information indicative of the UPF selected for the PDU session of the wireless device, the PPF being part of a RAN of the cellular communications network.

In some embodiments, a network node of a cellular communications network for enabling coordinated UPF and PPF selection comprises at least one processor, and memory comprising instructions executable by the at least one processor whereby the network node is operable to receive information indicative of a UPF selected for a PDU session of a wireless device where the UPF is part of a CN of the cellular communications network and select a PPF for the PDU session of the wireless device based on the information indicative of the UPF selected for the PDU session of the wireless device where the PPF is part of a RAN of the cellular communications network.

In some embodiments, a method of operation of a network node of a cellular communications network to enable coordinated UPF and PPF selection comprises selecting a UPF for a PDU session of a wireless device where the UPF is part of a CN of the cellular communications network, and sending, to another network node, a message comprising information indicative of the UPF selected for the PDU session of the wireless device.

In some embodiments, the information indicative of the UPF comprises UPF pool information for the UPF or UPF information for the UPF. In some embodiments, the information indicative of the UPF comprises information that identifies a name and/or location of the UPF. In some embodiments, the information indicative of the UPF comprises a UPF pool identity for the UPF, a UPF name of the UPF, a UPF address of the UPF, and/or a UPF location of the UPF.

In some embodiments, the method further comprises sending a session establishment request to the UPF.

In some embodiments, the method further comprises receiving, from another network node, a message comprising a transport address and TEID of a PPF selected for the PDU session of the wireless device where the PPF is part of a RAN of the cellular communications network. The method further comprises sending, to the UPF, a message comprising the transport address and the TEID of the PPF selected for the PDU session of the wireless device.

In some embodiments, selecting the UPF for the PDU session of the wireless device comprises selecting the UPF for the PDU session of the wireless device as part of an initial attachment procedure.

In some embodiments, selecting the UPF for the PDU session of the wireless device comprises selecting the UPF for the PDU session of the wireless device as part of a reselection or reallocation procedure.

In some embodiments, the PPF is logically separated from a RCF, the PPF is physically and logically separated from the RCF, or the PPF is physically and logically co-located with the RCF.

In some embodiments, a network node of a cellular communications network for enabling coordinated UPF and PPF selection is adapted to select a UPF for a PDU session of a wireless device where the UPF is part of a CN of the cellular communications network, and send, to another network node, a message comprising information indicative of the UPF selected for the PDU session of the wireless device.

In some embodiments, a network node of a cellular communications network for enabling coordinated UPF and PPF selection comprises at least one processor, and memory comprising instructions executable by the at least one processor whereby the network node is operable to select a UPF for a PDU session of a wireless device where the UPF is part of a CN of the cellular communications network and send, to another network node, a message comprising information indicative of the UPF selected for the PDU session of the wireless device.

In some embodiments, a method of operation of network node of a cellular communications network to enable coordinated UPF and PPF selection comprises receiving information indicative of a PPF selected for a PDU session of a wireless device where the PPF is part of a RAN of the cellular communications network and selecting a UPF for the PDU session of the wireless device based on the information indicative of the PPF selected for the PDU session of the wireless device where the UPF is part of a CN of the cellular communications network.

In some embodiments, the information indicative of the PPF comprises PPF pool information for the PPF or PPF information for the PPF. In some embodiments, the information indicative of the PPF comprises information that identifies a name and/or location of the PPF. In some embodiments, the information indicative of the PPF comprises a PPF pool identity for the PPF, a PPF name of the PPF, a PPF address of the PPF, and/or a PPF location of the PPF.

In some embodiments, selecting the UPF comprises selecting the UPF for the protocol PDU of the wireless device based on the information indicative of the PPF selected for the PDU session of the wireless device and a defined mapping of the information that identifies the PPF selected for the PDU session of the wireless device to one or more available UPFs including the UPF.

In some embodiments, selecting the UPF comprises selecting the UPF for the PDU session of the wireless device by locally translating the information indicative of the PPF selected for the PDU session of the wireless device to the UPF based on a defined mapping of the information that identifies the PPF selected for the PDU session of the wireless device to one or more available UPFs including the UPF.

In some embodiments, selecting the UPF comprises selecting the UPF for the PDU session of the wireless device by querying a separate database using the information indicative of the PPF selected for the PDU session of the wireless device to thereby translate the information indicative of the PPF selected for the PDU session of the wireless device to the UPF based on a defined mapping.

In some embodiments, the method further comprises sending, to the UPF, a message comprising a transport address and TEID of the PPF, and sending, to a CN node, a message comprising a transport address and TEID of the UPF to thereby enable establishment of a UP tunnel for the PDU session between the UPF and the PPF.

In some embodiments, receiving the information indicative of the PPF selected for the PDU session of the wireless device and selecting the UPF are part of an initial attachment procedure.

In some embodiments, receiving the information indicative of the PPF selected for the PDU session of the wireless device and selecting the UPF are part of a reselection or reallocation procedure.

In some embodiments, receiving the information indicative of the PPF selected for the PDU session of the wireless device comprises receiving a request from an AMF, the request comprising the information indicative of the PPF selected for the PDU session of the wireless device, a transport address of the PPF, and a TEID of the PPF. In some embodiments, the method further comprises sending, to the UPF, a session establishment request comprising the transport address and the TEID of the PPF, and sending, to the AMF, a response comprising a transport address and TEID of the UPF to thereby enable establishment of a UP tunnel for the PDU session between the UPF and the PPF.

In some embodiments, the PPF is logically separated from a RCF, the PPF is physically and logically separated from the RCF, or the PPF is physically and logically co-located with the RCF.

In some embodiments, a network node of a cellular communications network for enabling coordinated UPF and PPF selection is adapted to receive information indicative of a PPF selected for a PDU session of a wireless device where the PPF is part of a RAN of the cellular communications network, and select a UPF for the PDU session of the wireless device based on the information indicative of the PPF selected for the PDU session of the wireless device where the UPF is part of a CN of the cellular communications network.

In some embodiments, a network node of a cellular communications network for enabling coordinated UPF and PPF selection comprises at least one processor and memory comprising instructions executable by the at least one processor whereby the network node is operable to receive information indicative of a PPF selected for a PDU session of a wireless device where the PPF is part of a RAN of the cellular communications network and select a UPF for the PDU session of the wireless device based on the information indicative of the PPF selected for the PDU session of the wireless device where the UPF is part of a CN of the cellular communications network.

In some embodiments, a method of operation of network node of a cellular communications network to enable coordinated UPF and PPF selection comprises selecting PPF for a PDU session of a wireless device where the PPF is part of a CN of the cellular communications network, and sending, to another network node, a message comprising information indicative of the PPF selected for the PDU session of the wireless device.

In some embodiments, the information indicative of the PPF comprises PPF pool information for the PPF or PPF information for the PPF. In some embodiments, the information indicative of the PPF comprises information that identifies a name and/or location of the PPF. In some embodiments, the information indicative of the PPF comprises a PPF pool identity for the PPF, a PPF name of the PPF, a PPF address of the PPF, and/or a PPF location of the PPF.

In some embodiments, the method further comprises sending a session establishment request to the PPF.

In some embodiments, the method further comprises receiving, from another network node, a message comprising a transport address and TEID of a UPF selected for the PDU session of the wireless device where the UPF is part of a CN of the cellular communications network, and sending, to the PPF, a message comprising the transport address and the TEID of the UPF selected for the PDU session of the wireless device.

In some embodiments, selecting the PPF for the PDU session of the wireless device comprises selecting the PPF for the PDU session of the wireless device as part of an initial attachment procedure.

In some embodiments, selecting the PPF for the PDU session of the wireless device comprises selecting the PPF for the PDU session of the wireless device as part of a reselection or reallocation procedure.

In some embodiments, the network node is a RCF, and the PPF is logically separated from the RCF, the PPF is physically and logically separated from the RCF, or the PPF is physically and logically co-located with the RCF.

In some embodiments, a network node of a cellular communications network for enabling coordinated UPF and PPF selection is adapted to select a PPF for a PDU session of a wireless device where the PPF is part of a CN of the cellular communications network and send, to another network node, a message comprising information indicative of the PPF selected for the PDU session of the wireless device.

In some embodiments, a network node of a cellular communications network for enabling coordinated UPF and PPF selection comprises at least one processor and memory comprising instructions executable by the at least one processor whereby the network node is operable to select a PPF for a PDU session of a wireless device where the PPF is part of a CN of the cellular communications network and send, to another network node, a message comprising information indicative of the PPF selected for the PDU session of the wireless device.

BRIEF DESCRIPTION OF THE DRAWINGS

The accompanying drawing figures incorporated in and forming a part of this specification illustrate several aspects of the disclosure, and together with the description serve to explain the principles of the disclosure.

DETAILED DESCRIPTION

Figure 1:
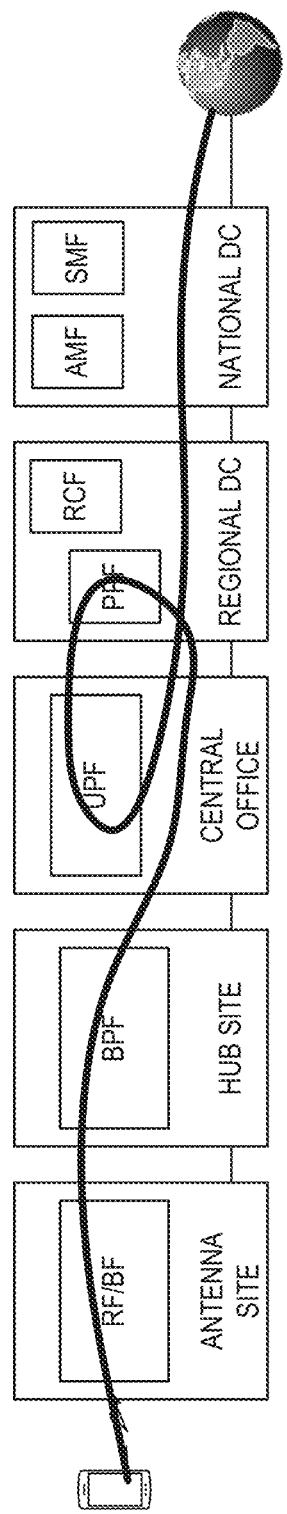
FIG. 1 illustrates the technical problem of uncoordinated User Plane (UP) Function (UPF) and Packet Processing Function (PPF) selection.

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a Radio Access Network (RAN) of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Next Generation RAN (NG-RAN) or an enhanced or evolved Node B (eNB) in a 3GPP Long Term Evolution (LTE) network), a high-power or macro base station, a low-power base station (e.g., a micro base station, a pico base station, a home eNB, or the like), and a relay node. A radio access node may also be other nodes in the RAN such as, for example, a Radio Control Function (RCF) or Packet Processing Function (PPF) in some implementations of a Fifth Generation (5G) RAN. Note that in 3GPP the logical node corresponding to the RCF is called CU-CP (Central Unit-Control Plane) and the logical node corresponding to the PPF is called CU-UP (Central Unit-User Plane).

Core Network (CN) Node: As used herein, a "CN node" is any type of node in a CN. Some examples of a CN node include, e.g., a Mobility Management Entity (MME), a Serving Gateway (S-GW), a Packet Data Network (PDN) Gateway (P-GW), a Service Capability Exposure Function (SCEF), a Session Management Function (SMF), a User Plane (UP) Function (UPF), an Access and Mobility Management Function (AMF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the RAN or the CN of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell;" however, particularly with respect to NG-RAN concepts, beams may be used instead of cells and, as such, it is important to note that the concepts described herein are equally applicable to both cells and beams.

5G systems are being currently specified by 3GPP, and in this context it can be seen that the 5G CN (5GC) is comprised of several functions, among which are the UPF. In a similar way, the 5G or NG-RAN contains a PPF, which may or may not be represented by a new logical function in 3GPP. If such PPF is not standardized as a separate logical function, it needs to be seen as part of a gNB/eNB/Central Unit (CU) (containing both PPF and RCF), otherwise it would be likely explicitly defined, and a 3GPP-defined interface would likely connect it to the RCF.

For 5G there is a new technical problem. In particular, if the selection of UPF and PPF is done in an uncoordinated manner, there is a possibility for a non-optimal routing (e.g., tromboning) of the UP, resulting in increased latency as the data packets need to pass both PPF and UPF by means of a non-optimal path. FIG. 1 illustrates one example of such uncoordinated selection of UPF and PPF. In this example the SMF has selected a UPF function in a central office site and the RCF has selected the PPF function in a regional data center site due to no coordination between these selections. The end result is the unnecessary tromboning in the transport network as shown in FIG. 1.

Another non optimal placement may be that the UPF and PPF may be placed at different central offices. This could for instance be a result of mobility or a poor selection of central office for the PPF after the UPF has been placed.

The problem may not only occur at initial selection of PPF and UPF, but also at reselection of, e.g., PPF due to load balancing in the RAN, UPF due to load-balancing in the CN or mobility of the UE.

Systems and methods are disclosed herein that solve the technical problem of uncoordinated selection of UPFs in the 5GC and NG-RAN in order to make it possible to optimize routing with reduced UP latency as a result, as well as optimizing the routing costs for the payload.

Embodiments of a method enabling a collaborative strategy between the RAN and CN to coordinate the PPF and UPF selection are disclosed. The PPF and UPF are typically selected at UE initial attach and can be reselected at UE mobility or for any other local reasons on either the RAN or CN side, e.g. load balancing between different PPFs or UPFs.

In some embodiments, the 5GC (SMF) selects UPF and informs the RAN (RCF) about which UPF pool has been selected. Based on that information, the RAN (RCF) can select PPF, taking the selected UPF into account. These embodiments may apply for initial attach as described herein. They may also apply for the case when the 5GC (SMF) reselects/reallocates an already existing UPF as in this case the 5GC also informs the RAN (RCF) about the reselected UPF pool. Again, based on that information, the RAN (RCF) can reselect PPF, taking the reselected UPF into account.

In some other embodiments, the RAN (RCF) selects PPF and informs the 5GC (SMF) about which PPF pool has been selected. Based on that information, the 5GC (SMF) can select UPF, taking the selected PPF into account. These embodiments may apply for the case when the NG-RAN (RCF) reselects/reallocates an existing PPF and then informs the 5GC (SMF) about the reselected PPF pool. Again, based on that information, the 5GC (SMF) can reselect UPF, taking the reselected PPF into account.

Figure 2:
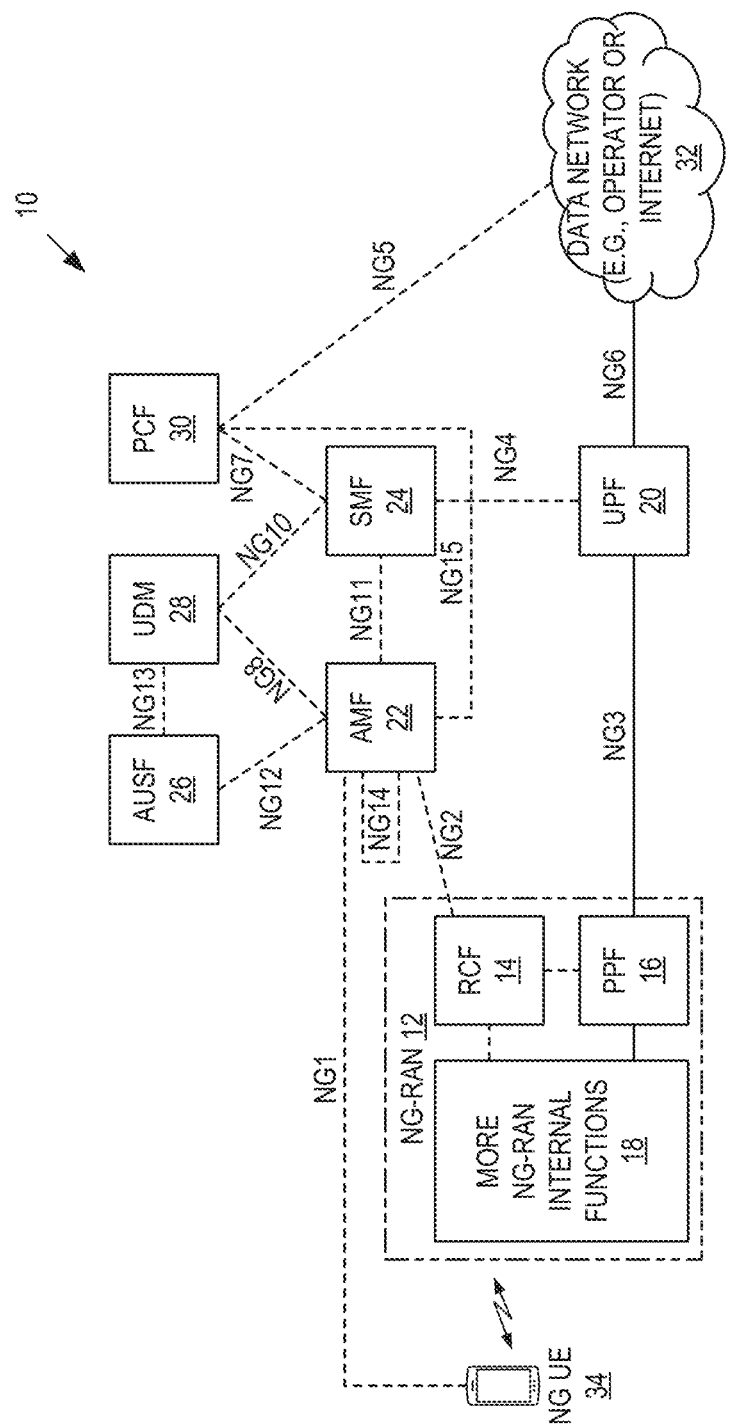
FIG. 2 illustrates one example of a cellular communications network, and in particular a Fifth Generation (5G) cellular communications network, in which embodiments of the present disclosure may be implemented.

FIG. 2 illustrates one example of a cellular communications network 10 in which embodiments of the present disclosure may be implemented. In this example, the cellular communications network 10 is a 5G network having the illustrated 5G architecture. The 5G architecture includes both PPF and UPF functions, among multiple other functions. It is worth noting that the "NG" interface names are also sometimes referred to as "N" interface, for example the NG11 interface can be called N11 interface.

As illustrated, the cellular communications network 10 includes a NG-RAN 12 that includes an RCF(s) 14, a PPF(s) 16, and other NG-RAN internal functions 18. Note that in 3GPP the logical node corresponding to the RCF 14 is called CU-CP (Central Unit-Control Plane) and the logical node corresponding to the PPF 16 is called CU-UP (Central Unit-User Plane). The 5GC includes various functions including a UPF(s) 20, an AMF(s) 22, an SMF(s) 24, an Authentication Server Function(s) (AUSF(s)) 26, a User Data Management(s) or Unified Data Management (UDM(s)) 28, and a Policy Control Function(s) (PCF(s)) 30. The UPF(s) 20 and the PCF(s) 30 are connected to a data network 32. The PPF 16 is logically separated from the RCF 14, the PPF 16 is physically and logically separated from the RCF 14, or the PPF 16 is physically co-located with the RCF 14, depending on the particular implementation. The functions 14 through 30 may be implemented in one or more CN nodes or, in some implementations, implemented "in the cloud" (e.g., implemented as one or more virtual machines).

Note that the names used herein for the various functional entities should be construed broadly because the naming of the functional entities, e.g. in 5G, is still evolving. Thus, names such as RCF, PPF, AMF, SMF, AUSF, UDM, and PCF used herein are not limited to only those functional entities having the same names. Rather, these names should be construed broadly to encompass any equivalent functional entity, regardless of the actual names used to refer to those functional entities.

In such a distributed deployment, when a UE 34 is connected, resources for UP communication need to be selected, in particular the UPF(s) 20 and the PPF(s) 16 supporting that particular UE 34. The selection of the PPF(s) 16 for the UE 34 is performed by the RCF 14 in the NG-RAN 12 and the selection of UPF(s) 20 for the UE 34 is performed by the SMF 24 in the CN.

Figure 3A:
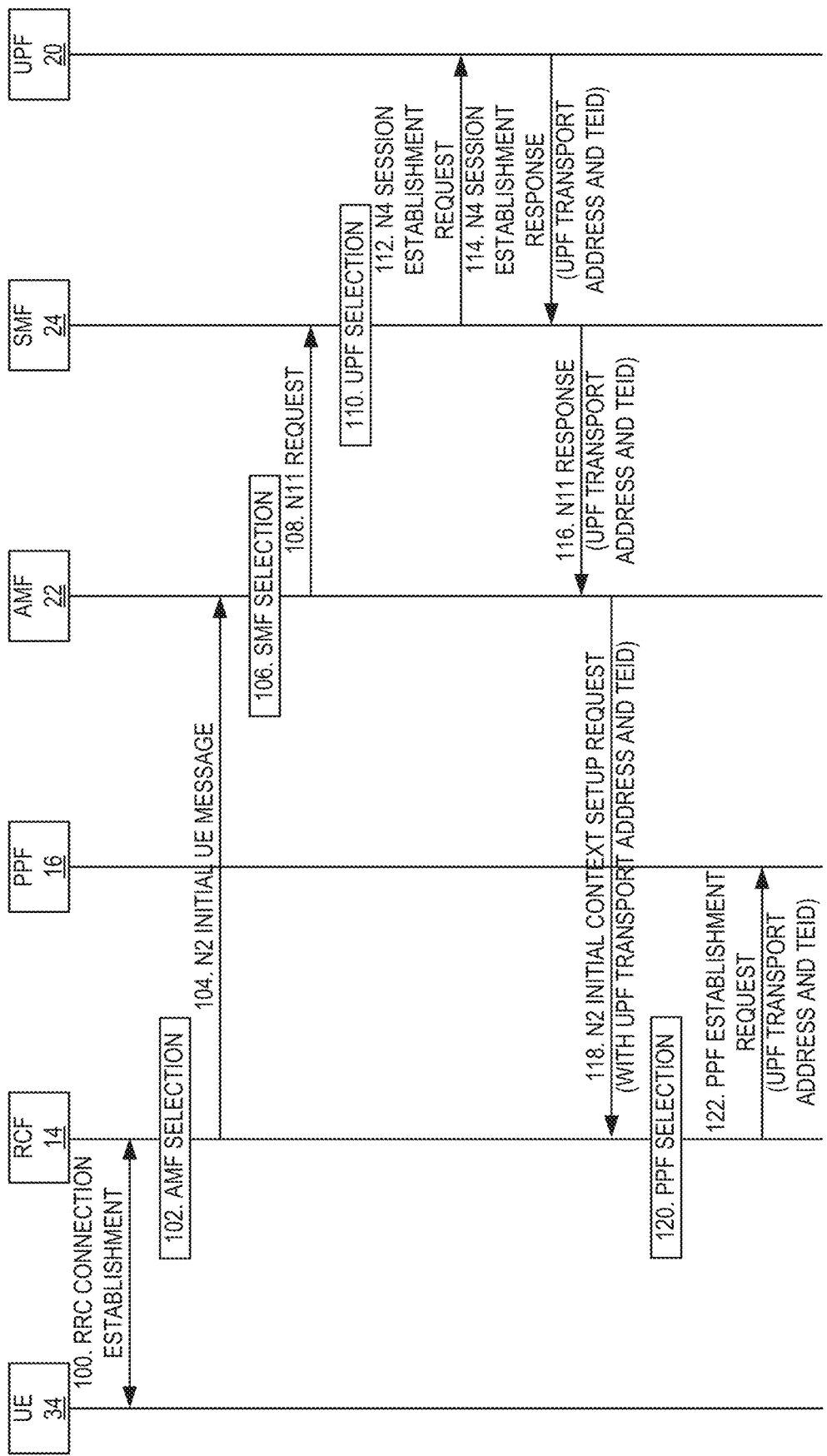
FIGS. 3A and 3B illustrate a conventional initial attach procedure for a 5G cellular communications network that suffers from the technical problem of uncoordinated UPF selection.
Figure 3B:
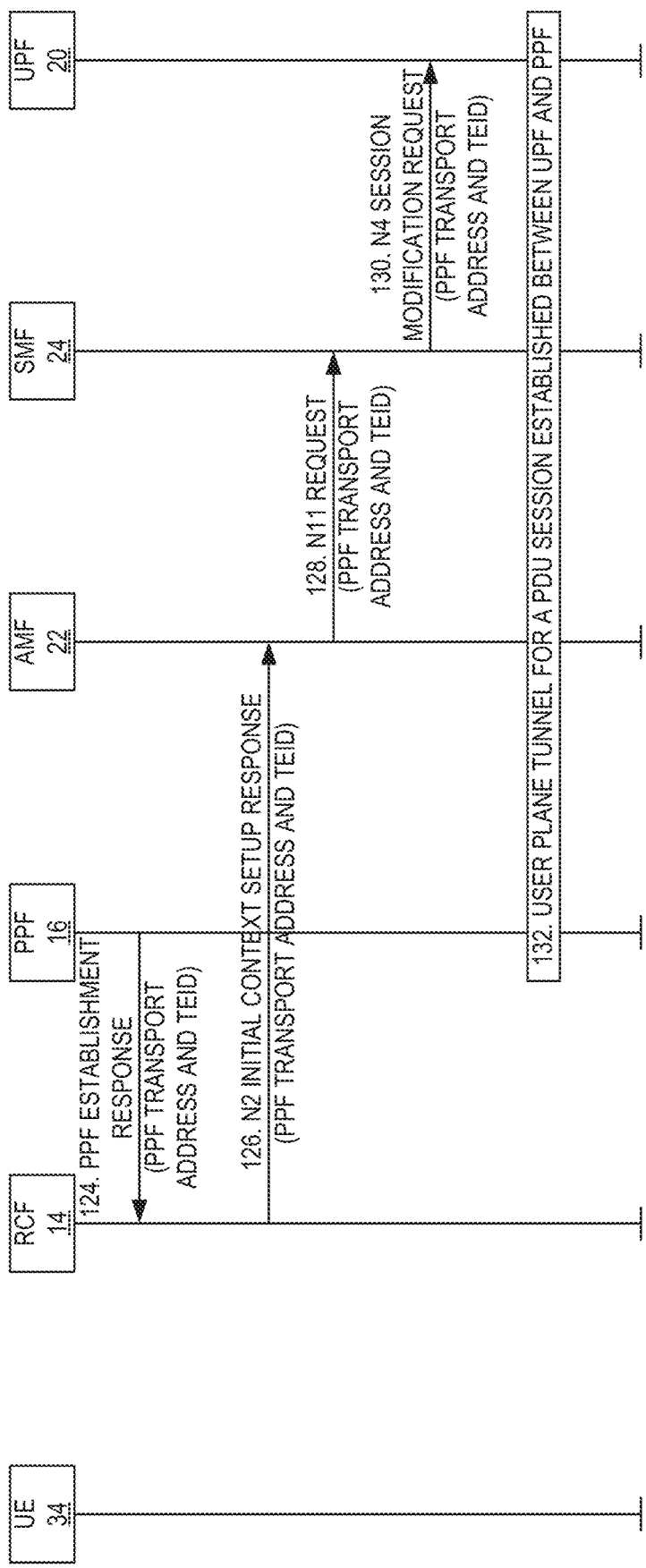

The signaling flow in FIGS. 3A and 3B shows, as an example, the case for UE initial attach (or registration as it is now called in 5G standardization in 3GPP) when a single UPF 20 and single PPF 16 are selected for the UE 34 in a conventional uncoordinated manner. However, the same process applies if multiple UPFs 20 and/or multiple PPFs 16 are selected, in which case there will be multiple PDU sessions. Note that not all signaling steps are shown; rather, the steps primarily related to UP establishment between PPFs and UPFs are shown. Due to uncoordinated UPF and PPF selection, the tromboning problem shown in FIG. 1 is one possible outcome of the selections of the UPF 20 and the PPF 16 for the UE 34. As illustrated, the UE 34 and the RCF 14 RRC connection establishment is performed (step 100). The RCF 14 performs AMF selection (step 102), and then sends an N2 initial UE message to the selected AMF 22 (step 104). The AMF 22 performs SMF selection (step 106), and then sends an N11 request to the selected SMF 24 (step 108). The SMF 24 performs UPF selection (step 110) and then sends an N4 session establishment request to the selected UPF 20 (step 112). The UPF 20 sends an N4 session establishment response to the SMF 24 (step 114). The SMF 24 sends an N11 response to the AMF 22 (step 116). The AMF 22 sends an N2 initial context setup request to the RCF 14 (step 118). The RCF 14 performs PPF selection (step 120) and then sends a PPF establishment request to the selected PPF 16 (step 122). Importantly, in this conventional process, PPF selection and UPF selection are performed in an uncoordinated manner.

The PPF 16 sends a PPF establishment response to the RCF 14 (step 124). The RCF 14 sends an N2 initial context setup response to the AMF 22 (step 126), the AMF 22 sends an N11 request to the SMF 24 (step 128), and the SMF 24 sends an N4 session modification request to the UPF 20 (step 130). A UP tunnel for a PDU session is established between the UPF 20 and the PPF 16 (step 132).

Embodiments of the present disclosure enable coordinated UPF and PPF selection. The following discussion focuses on two main embodiments as described. Additional embodiments and target systems are also described below.

In a first embodiment, the 5GC (re)selects first, and the NG-RAN may follow. More specifically, in the first embodiment, the 5GC (SMF 24) selects a UPF 20 and informs the RAN (RCF 14) about which UPF 20 that has been selected. The information shared from the CN to the NG-RAN 12 will be a parameter that identifies the UPF 20 by name and/or location and can, as an example, be UPF pool identity, UPF name (Fully Qualified Domain Name (FQDN) like or similar), UPF address, UPF location, etc. Based on that information, the RAN (RCF 14) can select a PPF 16, taking the selected UPF 20 into account by mapping the UPF identity/name/location to the different available PPFs 16. This translation can be done locally in the RCF 14 or by looking up a relation between UPF identity/name/location and the PPF identity/name/location in a separate database. The RCF 14 then selects the most optimal PPF 16 based on the UPF selection and other RAN internal criteria such as load information, etc. This first embodiment may apply for initial attach as described herein. It may also apply for the case when the 5GC (SMF 24) reselects/reallocates an already existing UPF 20 as in this case the 5GC also informs the RAN (RCF 14) about the reselected UPF pool. Again, based on that information, the RAN (RCF 14) can reselect the PPF 16, taking the reselected UPF 20 into account.

Note that a "UPF pool" is a group of UPFs 20 typically located at the same site (but they would not necessarily need to be depending on the topology of the network) and serving the same area (where area may be a logical or physical concept). The different UPFs 20 belonging to a UPF pool can be seen as UPF pool members and may provide similar functionality. It is also typical to perform load balancing between UPF pool members. UPF pool information is UPF pool identity, UPF pool name (FQDN like or similar), UPF pool address, UPF pool location, and/or the like. Likewise, a "PPF pool" is a group of PPFs 16 typically located at the same site (but they would not necessarily need to be depending on the topology of the network) and serving the same area (where area may be a logical or physical concept). The different PPFs 16 belonging to a PPF pool can be seen as PPF pool members and may provide similar functionality. It is also typical to perform load balancing between PPF pool members. PPF pool information is PPF pool identity, PPF pool name (FQDN like or similar), PPF pool address, PPF pool location, and/or the like.

Figure 4A:
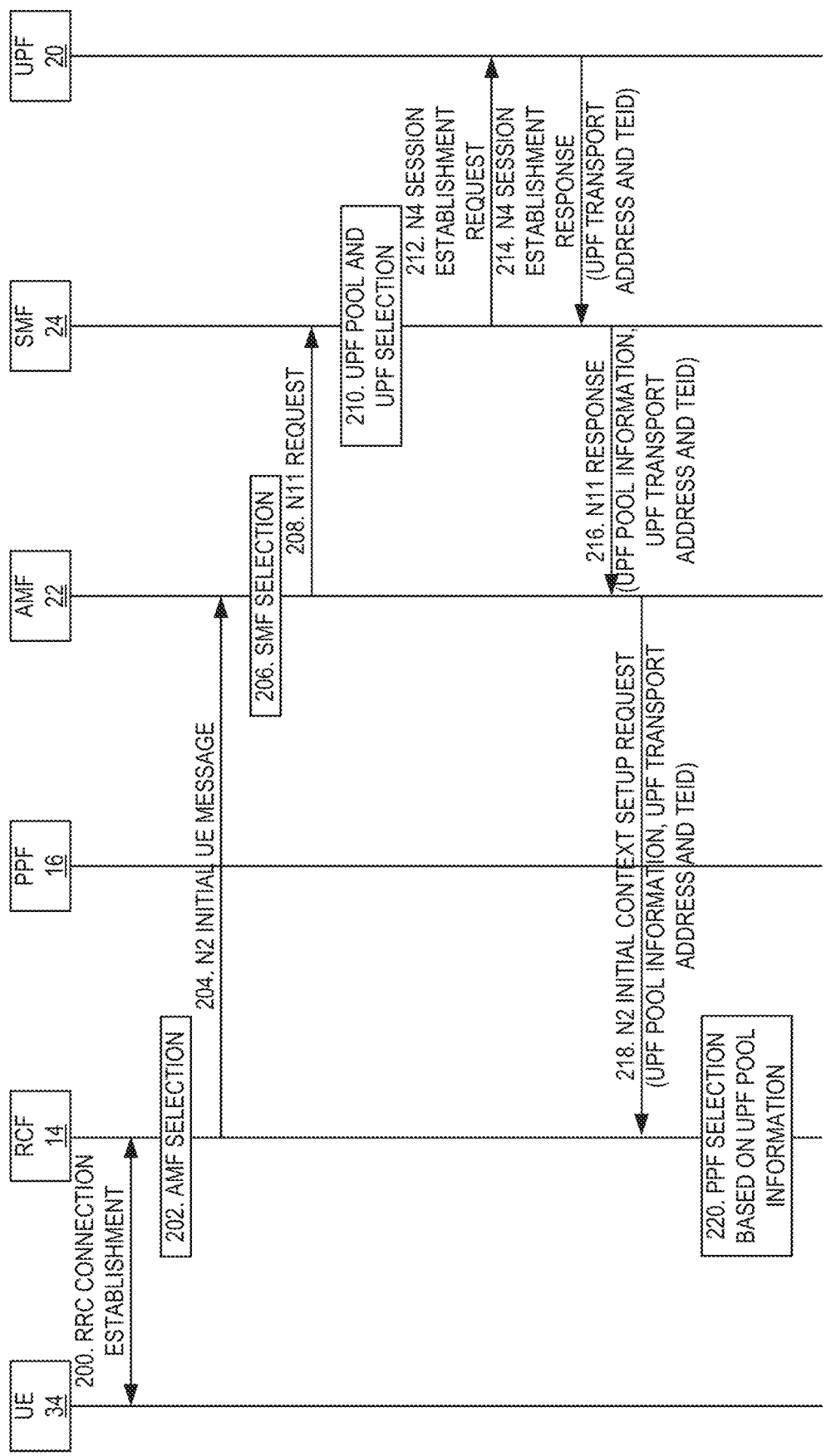
FIGS. 4A and 4B illustrate a process for coordinated initial selection of UPFs in accordance with some embodiments of the present disclosure.
Figure 4B:
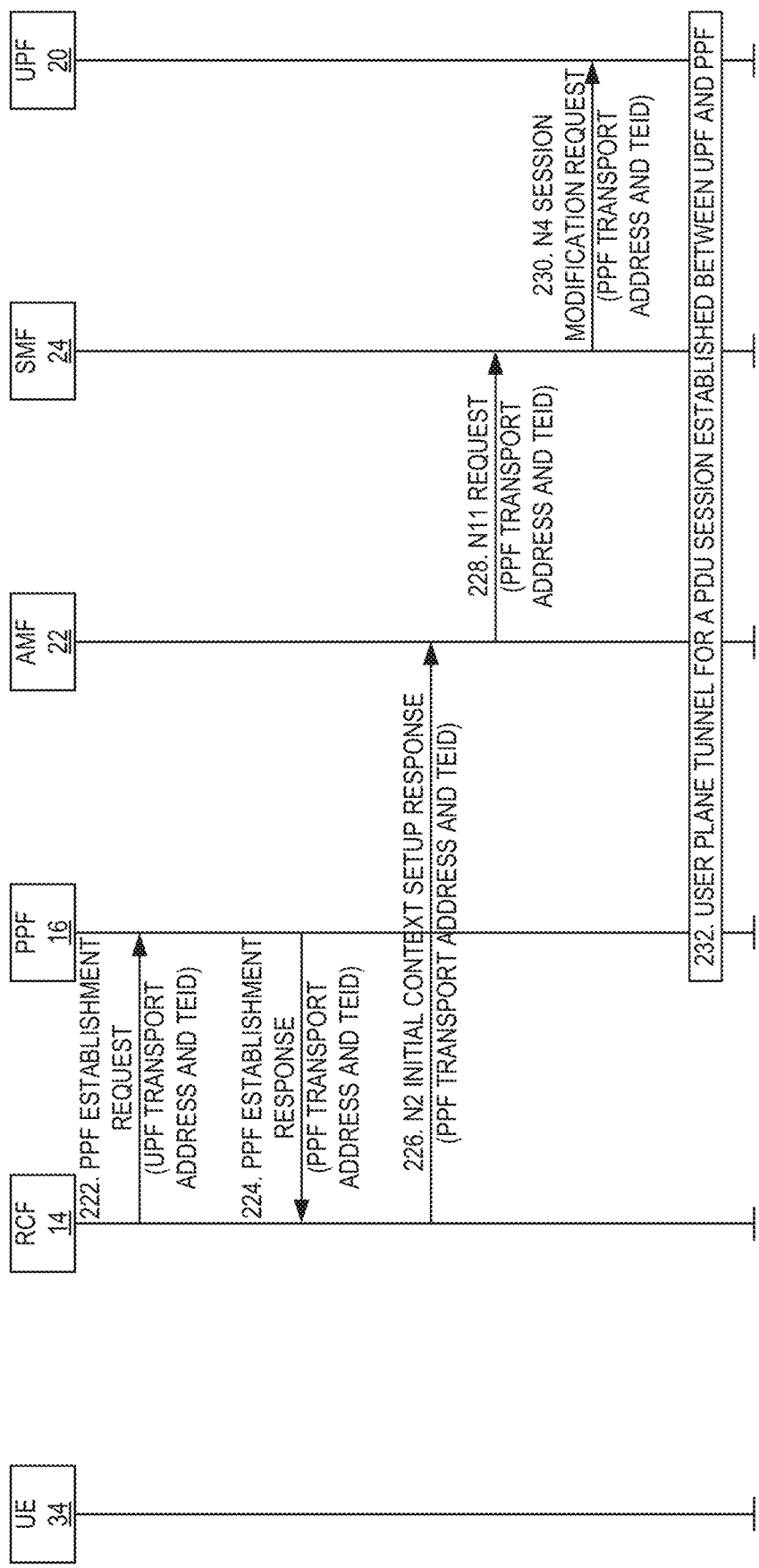

FIGS. 4A and 4B illustrate an example of the first embodiment for the initial selection of UPFs 20 according to some embodiments of the present disclosure. The signaling flow in FIGS. 4A and 4B shows, as an example, the case for UE initial attach (or registration as it is now called in 5G standardization in 3GPP) when a single UPF 20 and single PPF 16 are selected for the UE 34 in a coordinated manner. However, the same process applies if multiple UPFs 20 and/or multiple PPFs 16 are selected, in which case there will be multiple Protocol Data Unit (PDU) sessions and corresponding exchanges of information for coordinated selection UPFs 20 and PPFs 16 for the respective PDU sessions. As illustrated, the UE 34 and the RCF 14 perform RRC connection establishment (step 200). The RCF 14 performs AMF selection (step 202), and then sends an N2 initial UE message to the selected AMF 22 (step 204). The AMF 22 performs SMF selection (step 206), and then sends an N11 request to the selected SMF 24 (step 208). The SMF 24 performs UPF pool and UPF selection (step 210) and then sends an N4 session establishment request to the selected UPF 20 (step 212). The UPF 20 sends an N4 session establishment response to the SMF 24 (step 214). The SMF 24 sends an N11 response to the AMF 22 that includes information that identifies the selected UPF 20, which in this example is UPF pool information but may additionally or alternatively be UPF information (e.g., UPF name (FQDN like or similar), UPF address, UPF location, and/or the like) (step 216). The AMF 22 sends an N2 initial context setup request to the RCF 14 that, in this example, includes the UPF pool information (step 218). The RCF 14 performs PPF selection based on the UPF pool information (step 220) and then sends a PPF establishment request to the selected PPF 16 (step 222). By selecting the PPF 16 based on the UPF pool information, PPF and UPF selection is done in a coordinated manner. As discussed above, based on the UPF pool information, the RCF 14 can select the PPF 16, taking the selected UPF 20 into account by mapping the UPF identity/name/location to the different available PPFs 16. This translation can be done locally in the RCF 14 or by looking up a relation between UPF identity/name/location and the PPF identity/name/location in a separate database. The RCF 14 then selects the most optimal PPF 16 based on the UPF selection and other RAN internal criteria such as load information, etc.

The PPF 16 sends a PPF establishment response to the RCF 14 (step 224). The RCF 14 sends an N2 initial context setup response to the AMF 22 (step 226), the AMF 22 sends an N11 request to the SMF 24 (step 228), and the SMF 24 sends an N4 session modification request to the UPF 20 (step 230). A UP tunnel for a PDU session is established between the UPF 20 and the PPF 16 (step 232).

Note that the process of FIGS. 4A and 4B is only an example. The process may vary depending on the actual implementation of the cellular communications network 10. However, in any implementation, information regarding the selected UPF 20 is provided to the NG-RAN 12 (e.g., to the RCF 14) and used by the NG-RAN 12 (e.g., by the RCF 14) to select the PPF 16.

Figure 5A:
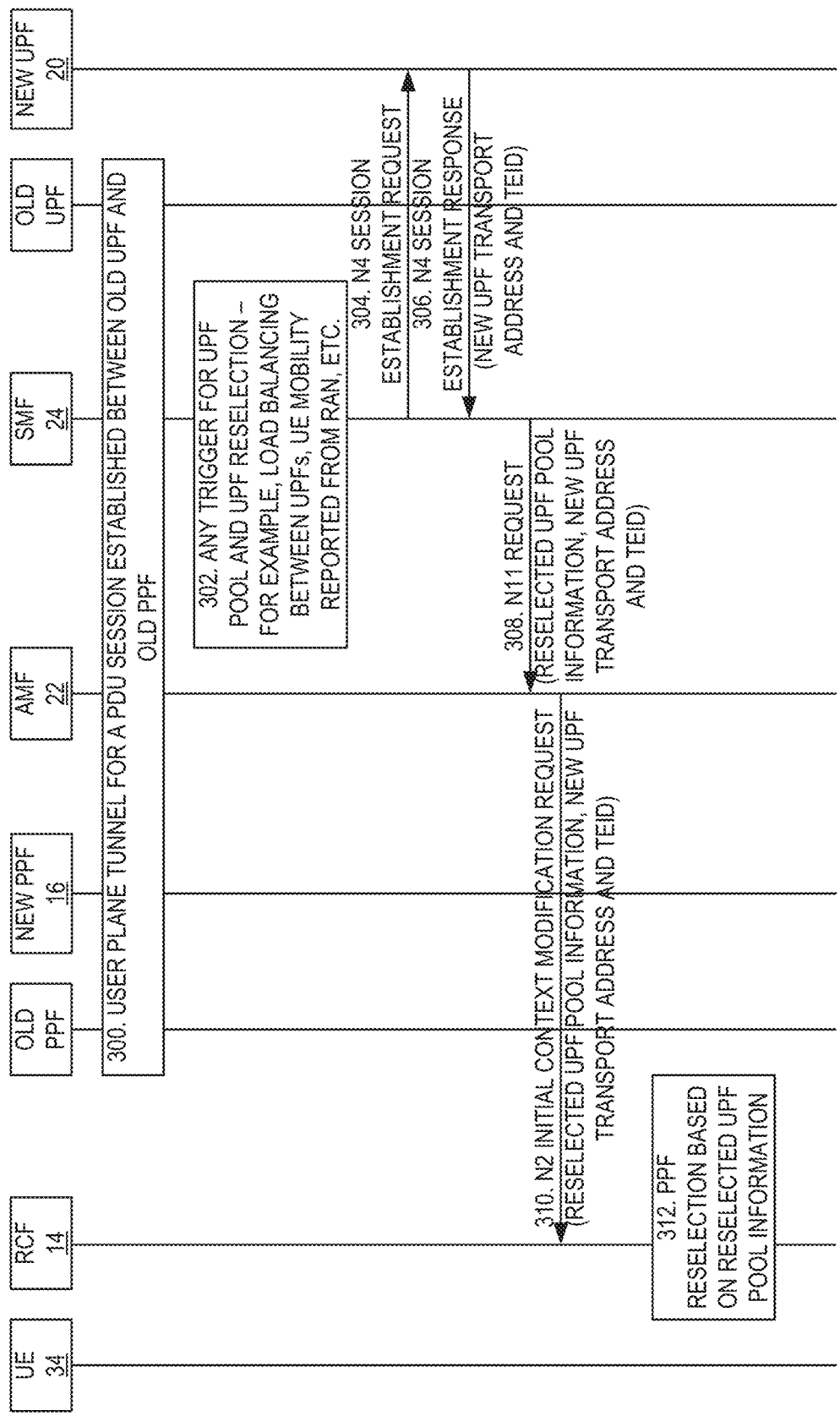
FIGS. 5A and 5B illustrate a process for coordinated reselections of UPFs in accordance with some embodiments of the present disclosure.
Figure 5B:
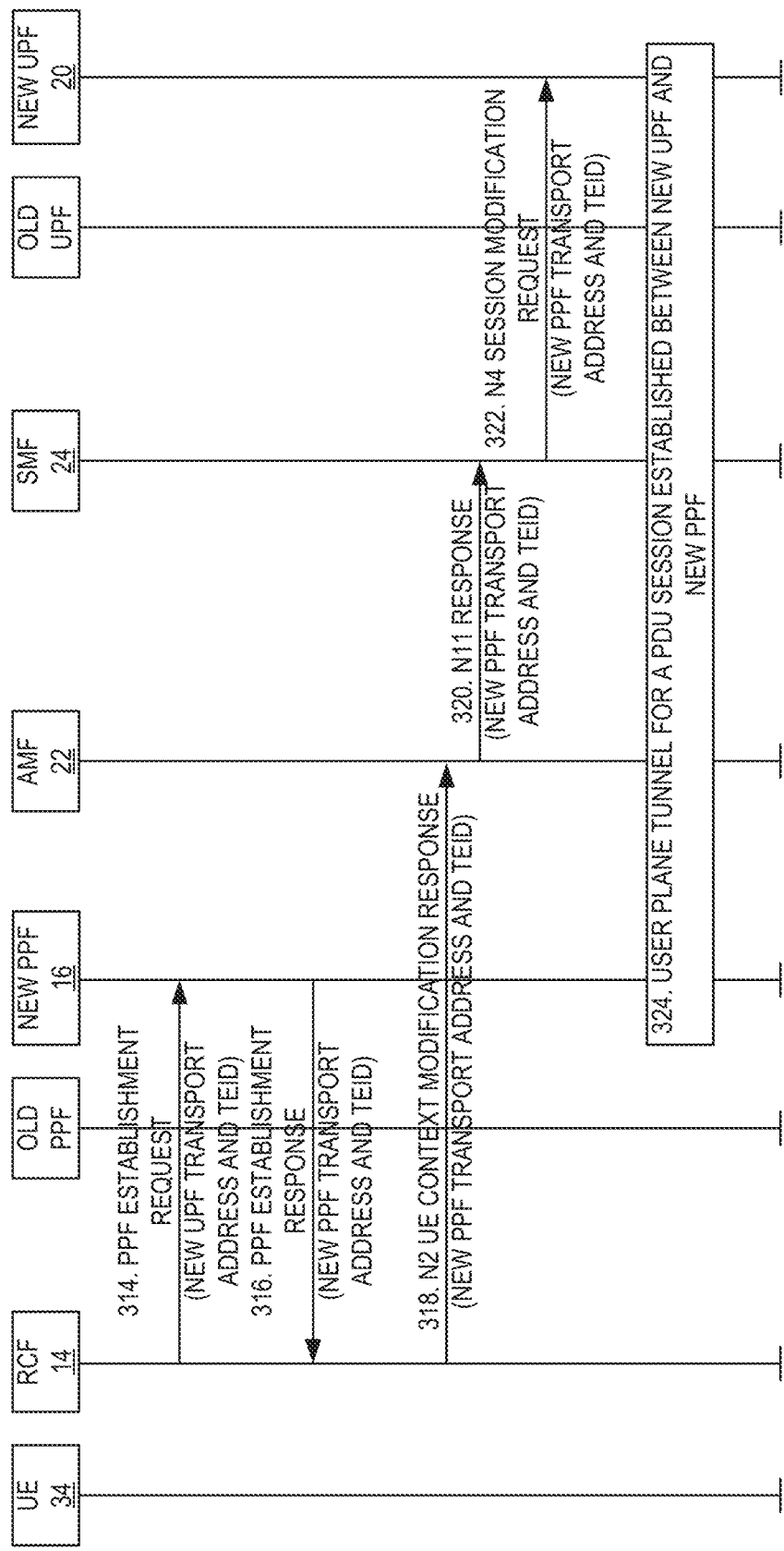

FIGS. 5A and 5B illustrate a process where coordinated UPF and PPF selection is performed with respect to reselection of UPFs according to some embodiments of the present disclosure. The actions in FIGS. 5A and 5B can be seen as happening after the actions shown in FIGS. 4A and 4B. One important aspect is that the UPF 20 can be reselected without impacting the UE 34 in the case when there are multiple UPFs 20 chained. It is possible to reselect any intermediate UPF 20 but the UPF 20 that is the Internet Protocol (IP) anchor point for the UE 34 cannot be reselected without also reallocating a new IP address for the UE 34.

As illustrated in FIGS. 5A and 5B, a UP tunnel for a PDU session is established between an old UPF and an old PPF of the UE 34, e.g., using the process of FIGS. 4A and 4B (step 300). The SMF 24 detects any trigger for UPF pool and UPF reselection (e.g., load balancing between UPFs, UE mobility reported from the NG-RAN 12, etc.) (step 302). Upon detection of the trigger, the SMF 24 selects a new UPF 20, and sends an N4 session establishment request to the new UPF 20 (step 304). The new UPF 20 responds with an N4 session establishment response (step 306). The SMF 24 sends an N11 request to the AMF 22 that includes information that identifies the new UPF 20, which in this example is the reselected UPF pool information but may additionally or alternatively be the reselected UPF information (e.g., UPF name (FQDN like or similar), UPF address, UPF location, and/or the like) (step 308). The AMF 22 sends an N2 initial context modification request to the RCF 14 that, in this example, includes the reselected UPF pool information (step 310). The RCF 14 performs PPF reselection based on the reselected UPF pool information (step 312) and then sends a PPF establishment request to the new PPF 16 (step 314). By selecting the new PPF 16 based on the reselected UPF pool information, PPF and UPF reselection is done in a coordinated manner. As discussed above, based on the reselected UPF pool information, the RCF 14 can select the new PPF 16, taking the new UPF 20 into account by mapping the UPF identity/name/location to the different available PPFs 16. This translation can be done locally in the RCF 14 or by looking up a relation between UPF identity/name/location and the PPF identity/name/location in a separate database. The RCF 14 then selects the most optimal PPF 16 based on the UPF selection and other RAN internal criteria such as load information, etc.

The new PPF 16 sends a PPF establishment response to the RCF 14 (step 316). The RCF 14 sends an N2 UE context modification response to the AMF 22 (step 318). The AMF 22 sends an N11 response to the SMF 24 (step 320), and the SMF 24 sends an N4 session modification request to the new UPF 20 (step 322). A UP tunnel for a PDU session is established between the new UPF 20 and the new PPF 16 (step 324). While not illustrated, the old PPF and the old UPF are released at any suitable time during the process.

Note that the process of FIGS. 5A and 5B is only an example. The process may vary depending on the actual implementation of the cellular communications network 10. However, in any implementation, information regarding the reselected UPF 20 is provided to the NG-RAN 12 (e.g., to the RCF 14) and used by the NG-RAN 12 (e.g., by the RCF 14) to reselect the PPF 16.

In a second embodiment, the NG-RAN 12 (re)selects first, and the 5GC may follow. More specifically, in the second embodiment, the NG-RAN 12 (RCF 14) selects a PPF 16 and informs the 5GC (SMF 24) about which PPF 16 has been selected. The information shared from the NG-RAN 12 to the 5GC (SMF 24) will be a parameter that identifies the PPF 16 by name and/or location and can, as an example, be PPF pool identity, PPF name (FQDN like or similar), PPF address, PPF location, etc. Based on that information, the 5GC (SMF 24) takes the selected PPF 16 into account by mapping the PPF identity/name/location to the different available UPFs. This translation can be done locally in the SMF 24 or by looking up a relation between PPF identity/name/location and the UPF identity/name/location in a separate database. The SMF 24 then selects the most optimal UPF 20 based on the PPF selection and other CN internal criteria such as load information. Based on that information, the 5GC (SMF 24) can select a UPF 20, taking the selected PPF 16 into account. This second embodiment may apply for the case when the NG-RAN 12 (RCF 14) reselects/reallocates an existing PPF 16 and then informs the 5GC (SMF 24) about the reselected PPF pool. Again, based on that information, the 5GC (SMF 24) can reselect the UPF 20, taking the reselected PPF 16 into account.

Figure 6A:
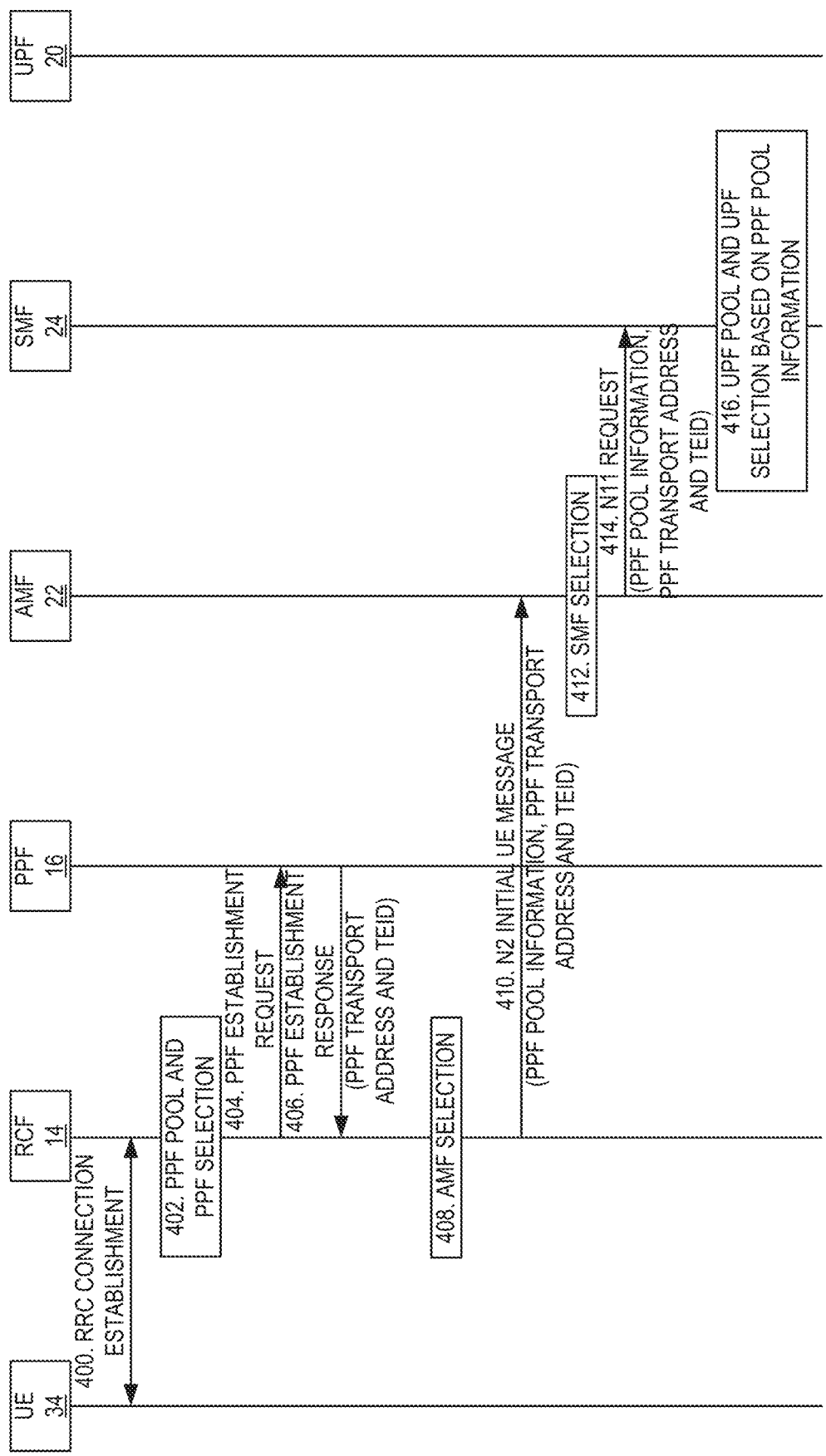
FIGS. 6A and 6B illustrate a process for coordinated initial selection of UPFs in accordance with some other embodiments of the present disclosure.
Figure 6B:
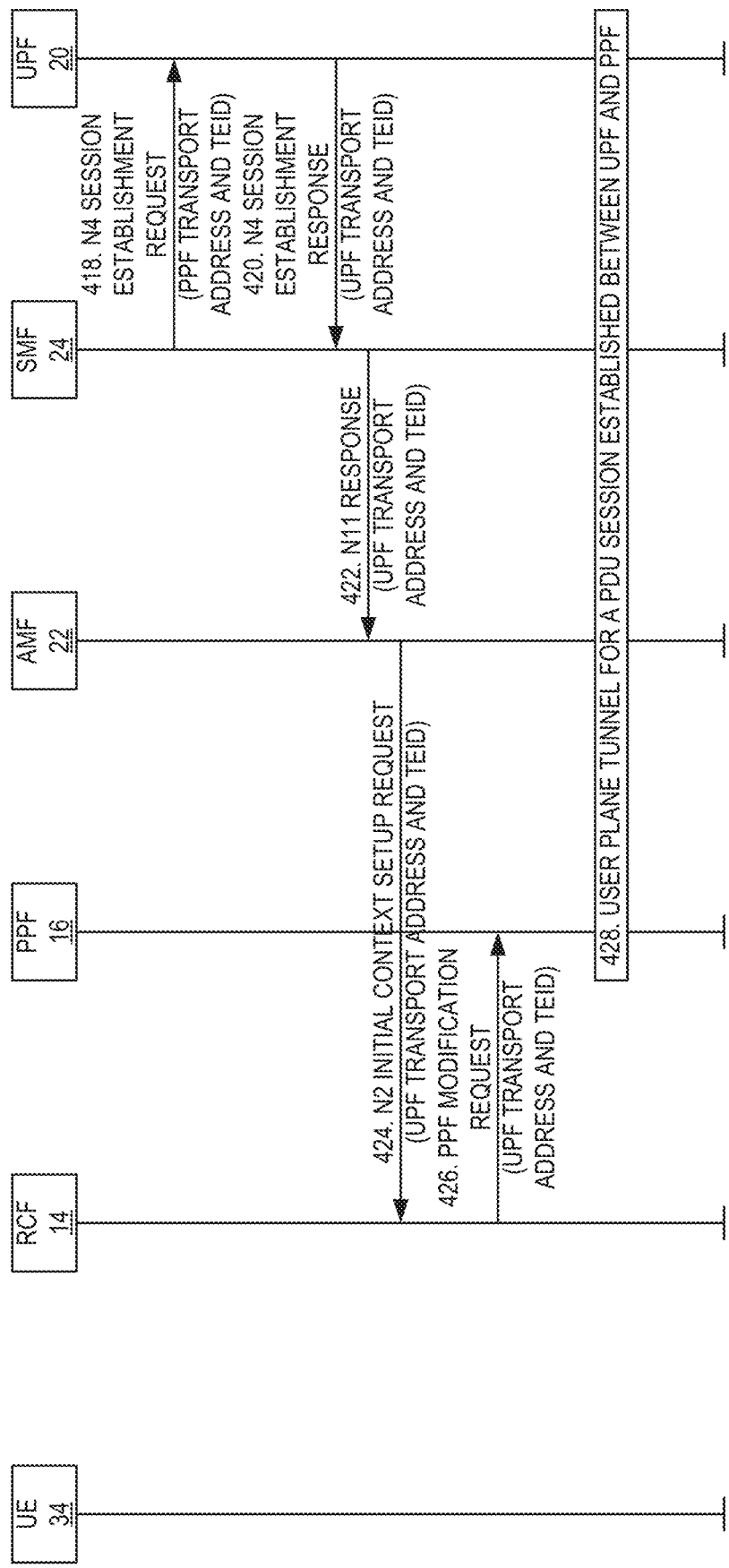

FIGS. 6A and 6B illustrate a process in which coordinated PPF and UPF selection is performed in the context of initial selection of UPFs in accordance with the second embodiment of the present disclosure. However, the same process applies if multiple UPFs 20 and/or multiple PPFs 16 are selected, in which case there will be multiple PDU sessions and corresponding exchanges of information for coordinated selection UPFs 20 and PPFs 16 for the respective PDU sessions. For this embodiment the NG-RAN 12 (RCF 14) selects the PPF 16 already after RRC connection establishment and at this stage the NG-RAN 12 (RCF 14) may have limited information available about the different NG3 tunnels that need to be established (i.e., PDU session tunnels between UPF and PPF established after PPF and UPF selection). One possibility for this case is that the RCF 14 just selects a default PPF 16 that can be reselected later on when the RCF 14 has more information for this decision.

As illustrated, the UE 34 and the RCF 14 perform RRC connection establishment (step 400). The RCF 14 performs PPF pool and PPF selection (step 402) and sends a PPF establishment request to the selected PPF 16 (step 404). The PPF 16 sends a PPF establishment response to the RCF 14 (step 406). The RCF 14 also performs AMF selection (step 408) and then sends an N2 initial UE message to the selected AMF 22 (step 410). The N2 initial UE message includes the PPF pool information for the selected PPF 16 but may additionally or alternatively include PPF information (e.g., PPF name (FQDN like or similar), PPF address, PPF location, and/or the like). The AMF 22 performs SMF selection (step 412), and then sends an N11 request to the selected SMF 24 including the PPF pool information (or alternatively PPF information) for the selected PPF 16 (step 414). The SMF 24 performs UPF pool and UPF selection based on the PPF pool information (or alternatively the PPF information) for the selected PPF 16, as described above, (step 416) and then sends an N4 session establishment request to the selected UPF 20 (step 418). The UPF 20 sends an N4 session establishment response to the SMF 24 (step 420). The SMF 24 sends an N11 response to the AMF 22 (step 422), the AMF 22 sends an N2 initial context setup request to the RCF 14 (step 424), and the RCF 14 sends a PPF modification request to the selected PPF 16 that includes the UPF transport address and Tunnel Endpoint Identifier (TEID) (step 426). A UP tunnel for a PDU session is established between the UPF 20 and the PPF 16 (step 428).

Note that the process of FIGS. 6A and 6B is only an example. The process may vary depending on the actual implementation of the cellular communications network 10. However, in any implementation, information regarding the selected PPF 16 is provided to the 5GC (e.g., to the SMF 24) and used by the 5GC (e.g., by the SMF 24) to select the UPF 20.

Figure 7A:
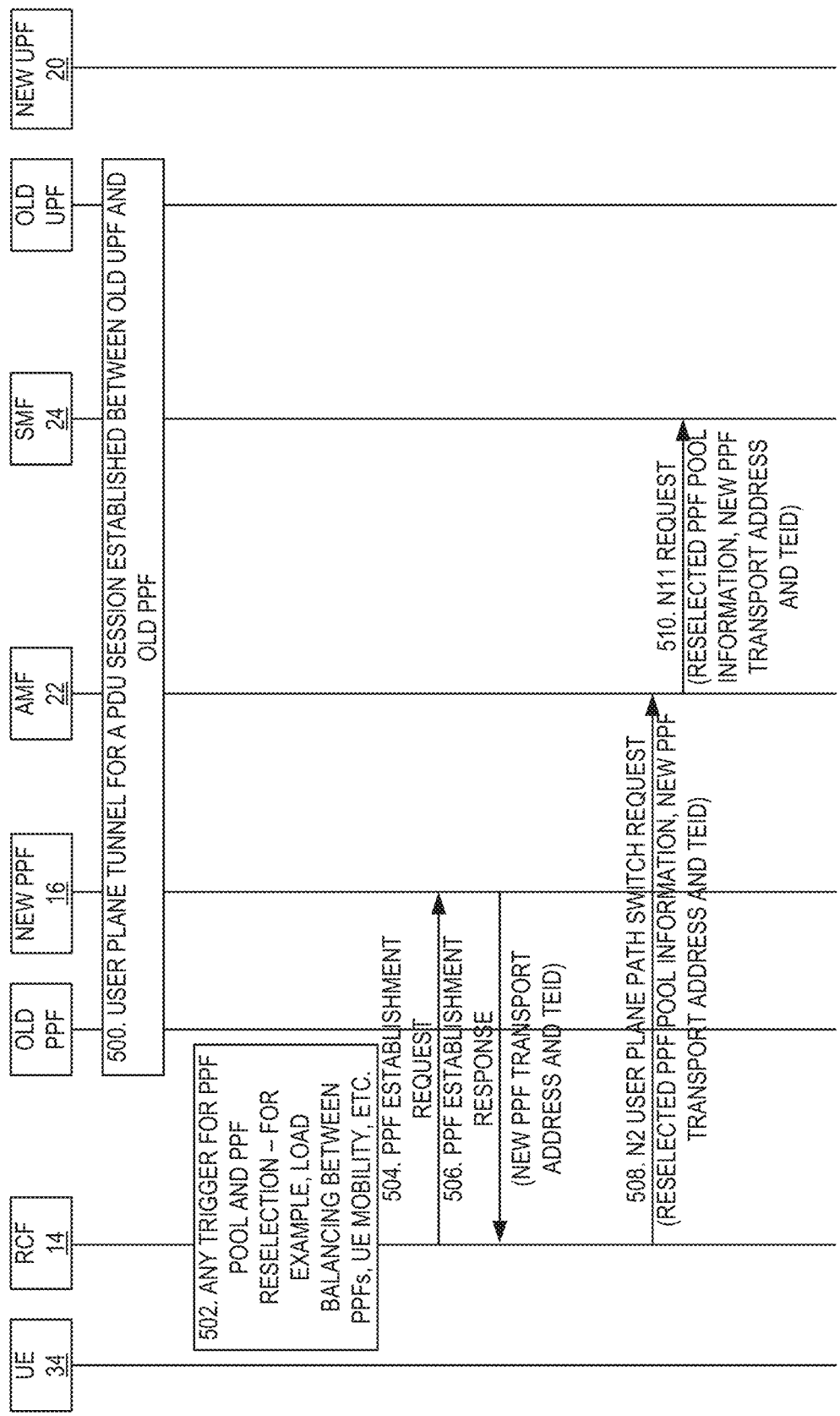
FIGS. 7A and 7B illustrate a process for coordinated reselection for UPFs in accordance with some other embodiments of the present disclosure.
Figure 7B:
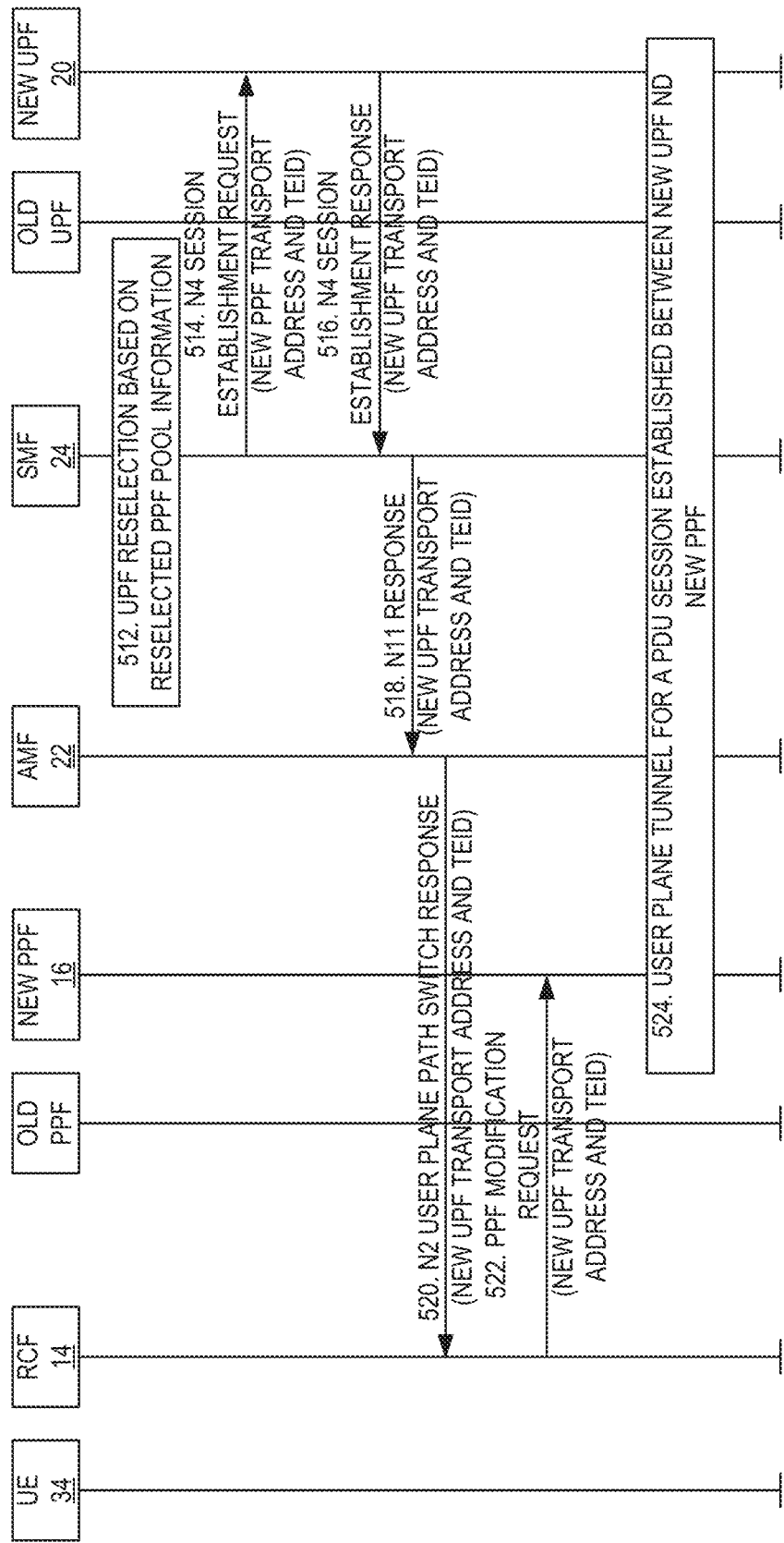

FIGS. 7A and 7B illustrate a process in which coordinated PPF and UPF selection is performed in the context of PPF reselection in accordance with the second embodiment of the present disclosure. The actions in FIGS. 7A and 7B can be seen as happening after the actions shown in, e.g., FIGS. 4A and 4B or FIGS. 6A and 6B.

As illustrated in FIGS. 7A and 7B, a UP tunnel for a PDU session is established between an old UPF and an old PPF of the UE 34, e.g., using the process of FIGS. 4A and 4B or the process of FIGS. 6A and 6B (step 500). The RCF 14 detects any trigger for PPF pool and PPF reselection (e.g., load balancing between PPFs, UE mobility, etc.) (step 502). Upon detection of the trigger, the RCF 14 selects a new PPF 16, and sends a PPF establishment request to the new PPF 16 (step 504). The new PPF 16 responds with a PPF establishment response (step 506). The RCF 14 also sends an N2 UP path switch request to the AMF 22 that includes reselected PPF pool information for the new PPF 16 but may additionally or alternatively include the reselected PPF information (e.g., PPF name (FQDN like or similar), PPF address, PPF location, and/or the like) (step 508). The AMF 22 sends an N11 request to the SMF 24 that includes the reselected PPF pool information for the new PPF 16 (step 510). The SMF 24 selects a new UPF 20 based on the reselected PPF pool information for the new PPF 16 (step 512), as discussed above, and sends an N4 session establishment request to the new UPF 20 (step 514). The new UPF 20 responds with an N4 session establishment response (step 516). The SMF 24 sends an N11 response to the AMF 22 (step 518) and the AMF 22 sends an N2 UP path switch response to the RCF 14 that, in this example, includes the new UPF 20 transport address and TEID (step 520). The RCF 14 sends a PPF modification request including the new UPF 20 transport address and TEID to the new PPF 16 (step 522). A UP tunnel for a PDU session is established between the new UPF 20 and the new PPF 16 (step 524). While not illustrated, the old PPF and the old UPF are released at any suitable time during the process.

Note that the process of FIGS. 7A and 7B is only an example. The process may vary depending on the actual implementation of the cellular communications network 10. However, in any implementation, information regarding the reselected PPF 16 is provided to the 5GC (e.g., to the SMF 24) and used by the 5GC (e.g., by the SMF 24) to reselect the UPF 20.

Some additional embodiments are as follows. The first and second embodiments can also be combined in different ways and while doing this some of the steps shown can be made optional. One such example is the following combination of first and second embodiments: 1) the RCF 14 selects a PPF 16 and informs the CN about the selection, 2) the CN may or may not take the PPF selection into account when the SMF 24 selects a UPF 20 and 3) the CN informs the NG-RAN 12/RCF 14 about the selected UPF 20 for possible later reselection of the PPF 16.

The description is mainly given in relation to 5G networks, i.e. 5GC and NG-RAN 12. However, the procedures disclosed herein apply to any mobile networks in which there is a desire to select UPFs 20 and PPFs 16 in a coordinated manner. One example is the case when the RAN split to RCF and PPF is applied to another Radio Access Technology (RAT), for example for LTE. Another example is the existing LTE architecture with a complete eNB as also in this case the selection of UP terminations is done in an uncoordinated way. The RAN side, i.e., the eNB is selected, e.g., when the UE connects to the eNB and the UP termination is selected simultaneously, while the CN side is selected later on and not necessarily taking into account the eNB location.

Also, it is important to note that the RCF 14 and PPF 16 may be physically separate (i.e., implemented on a physically separate network node) or may be logically separate but on the same network node. Further, in some alternative embodiments, the functionality of the RCF 14 and the PPF 16 described herein may be combined into a single functional entity.

While not being limited to or by any particular advantages, embodiments of the present disclosure provide the following advantages. One advantage is that there is a coordinated selection of the UPFs in the 5GC and the PPFs in the NG-RAN. Without any coordination of the selection in the CN and RAN respectively, the choice of UPFs and PPFs can result in in-optimal routing of user data traffic that may result in longer delays, extra transport hops, and thereby extra transport costs.

Figure 8:
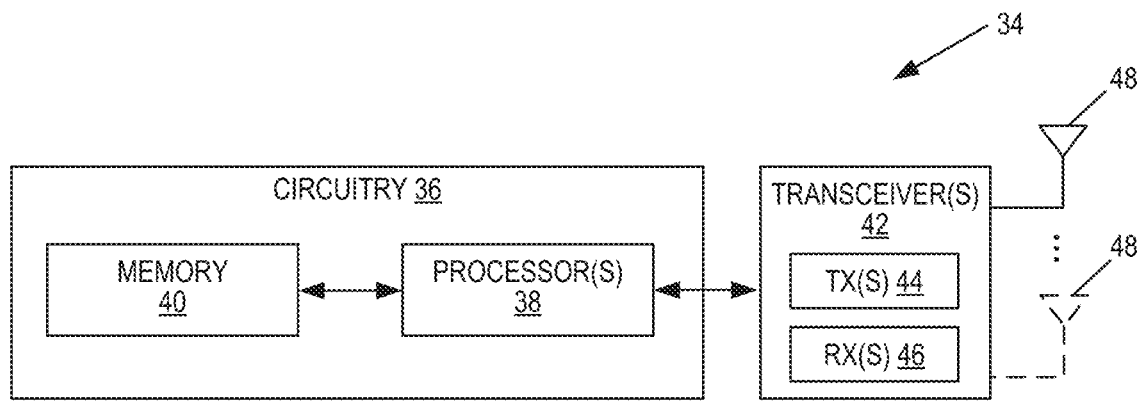
FIGS. 8 and 9 illustrate example embodiments of a wireless device.

FIG. 8 is a schematic block diagram of the UE 34 according to some embodiments of the present disclosure. As illustrated, the UE 34 includes circuitry 36 comprising one or more processors 38 (e.g., Central Processing Units (CPUs), Application Specific Integrated Circuits (ASICs), Field Programmable Gate Arrays (FPGAs), Digital Signal Processors (DSPs), and/or the like) and memory 40. The UE 34 also includes one or more transceivers 42 each including one or more transmitters 44 and one or more receivers 46 coupled to one or more antennas 48. In some embodiments, the functionality of the UE 34 described above may be implemented in hardware (e.g., via hardware within the circuitry 36 and/or within the processor(s) 38) or be implemented in a combination of hardware and software (e.g., fully or partially implemented in software that is, e.g., stored in the memory 40 and executed by the processor(s) 38).

In some embodiments, a computer program including instructions which, when executed by the at least one processor 38, causes the at least one processor 38 to carry out at least some of the functionality of the UE 34 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as memory).

Figure 9:
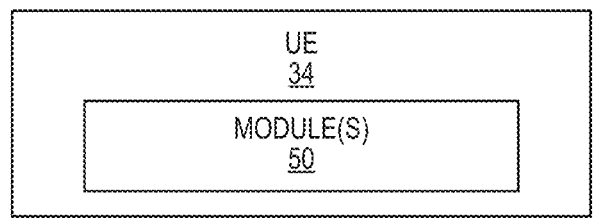

FIG. 9 is a schematic block diagram of the UE 34 according to some other embodiments of the present disclosure. The UE 34 includes one or more modules 50, each of which is implemented in software. The module(s) 50 provide the functionality of the UE 34 described herein.

Figure 10:
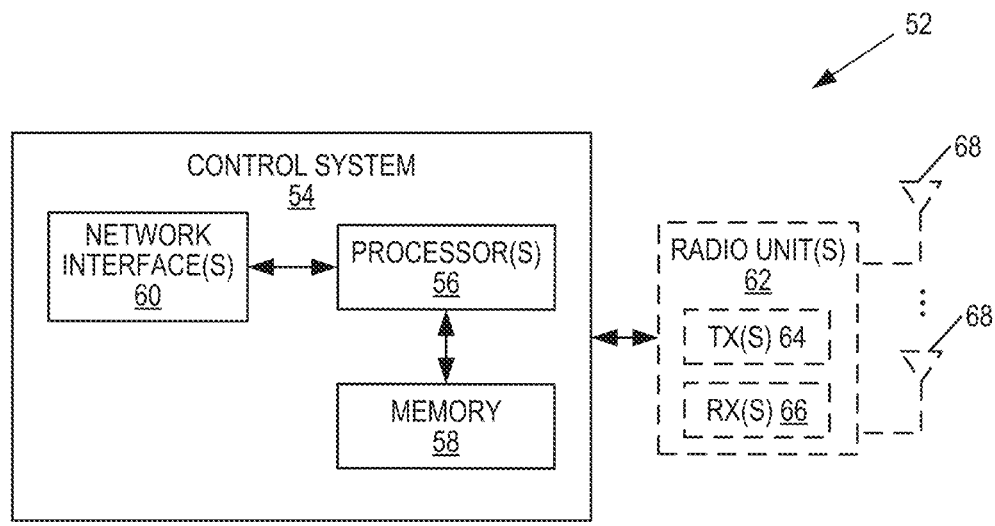
FIGS. 10 through 12 illustrate example embodiments of a network node.

FIG. 10 is a schematic block diagram of a network node 52 (e.g., a radio access node such as, for example, an eNB or gNB or a CN node) according to some embodiments of the present disclosure. As illustrated, the network node 52 includes a control system 54 that includes circuitry comprising one or more processors 56 (e.g., CPUs, ASICs, DSPs, FPGAs, and/or the like) and memory 58. The control system 54 also includes a network interface 60. In embodiments in which the network node 52 is a radio access node, the network node 52 may also include one or more radio units 62 that each include one or more transmitters 64 and one or more receivers 66 coupled to one or more antennas 68. In some embodiments, the functionality of the PPF 16, the AMF 22, the SMF 24, or the UPF 20 described above may be fully or partially implemented in the network node 52 as software that is, e.g., stored in the memory 58 and executed by the processor(s) 56.

Figure 11:
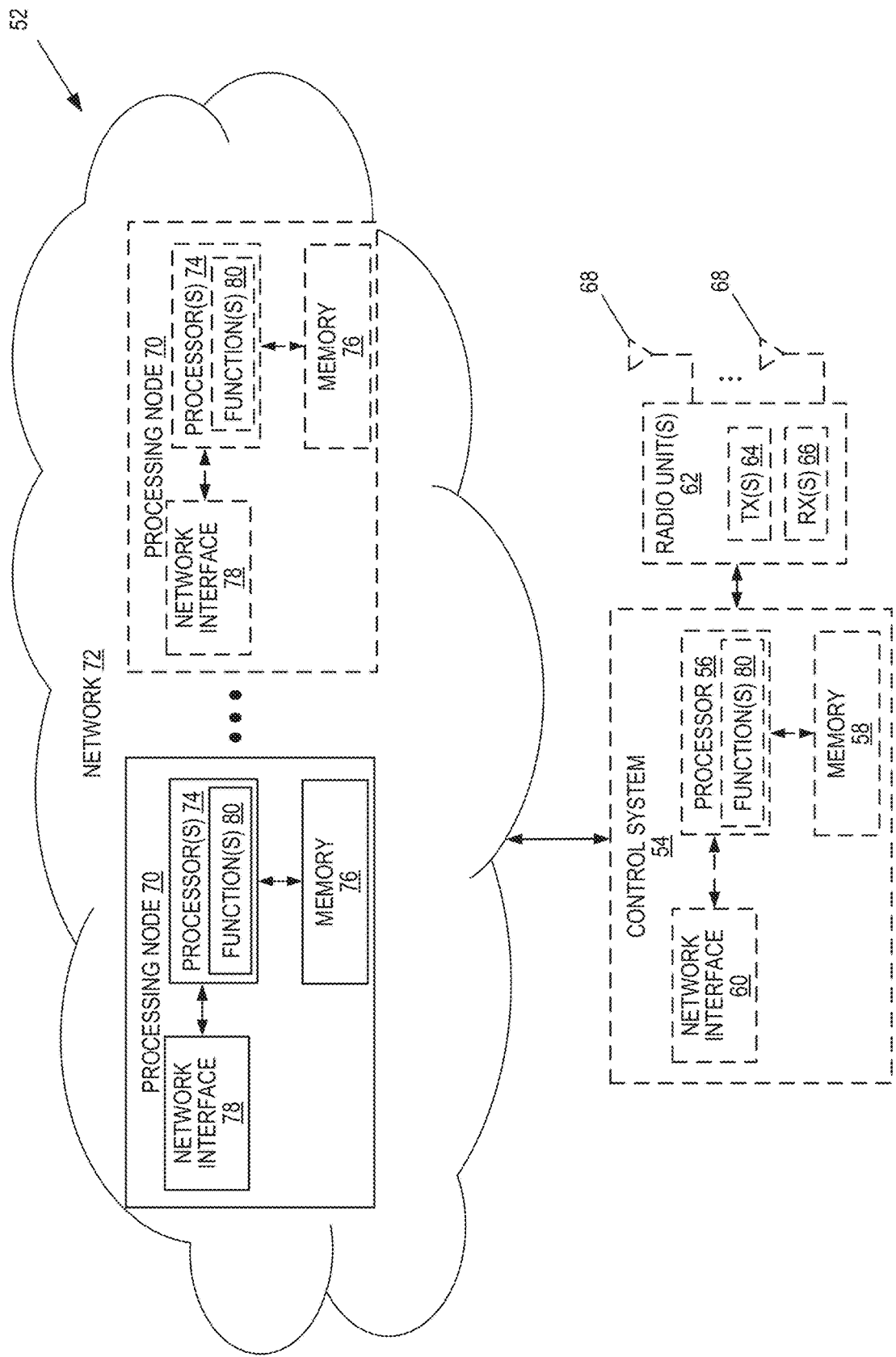

FIG. 11 is a schematic block diagram that illustrates a virtualized embodiment of the network node 52 (e.g., a radio access node or a CN node) according to some embodiments of the present disclosure. As used herein, a "virtualized" network node 52 is a network node 52 in which at least a portion of the functionality of the network node 36 is implemented as a virtual component (e.g., via a virtual machine(s) executing on a physical processing node(s) in a network(s)). As illustrated, the network node 52 optionally includes the control system 54, as described with respect to FIG. 10. In addition, if the network node 52 is a radio access node, the network node 52 may also include the one or more radio units 62, as described with respect to FIG. 10. The control system 54 (if present) is connected to one or more processing nodes 70 coupled to or included as part of a network(s) 72 via the network interface 60. Alternatively, if the control system 54 is not present, the one or more radio units 62 (if present) are connected to the one or more processing nodes 70 via a network interface(s). Alternatively, all of the functionality of the network node 52 described herein may be implemented in the processing nodes 70. Each processing node 70 includes one or more processors 74 (e.g., CPUs, ASICs, DSPs, FPGAs, and/or the like), memory 76, and a network interface 78.

In this example, functions 80 of the network node 52 (e.g., the functionality of the PPF 16, the AMF 22, the SMF 24, or the UPF 20 described above) described herein are implemented at the one or more processing nodes 70 or distributed across the control system 54 (if present) and the one or more processing nodes 70 in any desired manner. In some particular embodiments, some or all of the functions 80 of the network node 52 described herein are implemented as virtual components executed by one or more virtual machines implemented in a virtual environment(s) hosted by the processing node(s) 70. As will be appreciated by one of ordinary skill in the art, additional signaling or communication between the processing node(s) 70 and the control system 54 (if present) or alternatively the radio unit(s) 62 (if present) is used in order to carry out at least some of the desired functions. Notably, in some embodiments, the control system 54 may not be included, in which case the radio unit(s) 62 (if present) communicates directly with the processing node(s) 70 via an appropriate network interface(s).

In some particular embodiments, higher layer functionality (e.g., layer 3 and up and possibly some of layer 2 of the protocol stack) of the network node 52 may be implemented at the processing node(s) 70 as virtual components (i.e., implemented "in the cloud") whereas lower layer functionality (e.g., layer 1 and possibly some of layer 2 of the protocol stack) may be implemented in the radio unit(s) 62 and possibly the control system 54.

In some embodiments, a computer program including instructions which, when executed by the at least one processor 56, 74, causes the at least one processor 56, 74 to carry out the functionality of the network node 52 or a processing node 70 according to any of the embodiments described herein is provided. In some embodiments, a carrier containing the aforementioned computer program product is provided. The carrier is one of an electronic signal, an optical signal, a radio signal, or a computer readable storage medium (e.g., a non-transitory computer readable medium such as the memory 76).

Figure 12:
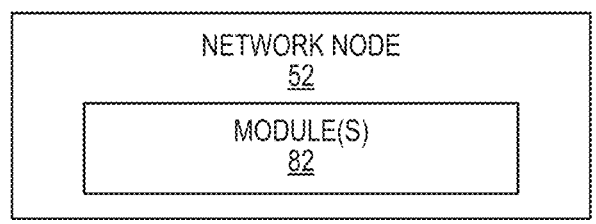

FIG. 12 is a schematic block diagram of the network node 52 (e.g., a radio access node or a CN node) according to some other embodiments of the present disclosure. The network node 52 includes one or more modules 82, each of which is implemented in software. The module(s) 82 provide, in some embodiments, the functionality of the PPF 16, the AMF 22, the SMF 24, or the UPF 20 described above.

While not being limited thereto, some example embodiments of the present disclosure are provided below.

Embodiment 1: A method of operation of network node (14, 52) of a cellular communications network (10) to enable coordinated UPF and PPF selection, comprising: receiving (218, 310) information indicative of a UPF (20) selected for a protocol data unit session of a wireless device (34), the UPF (20) being part of a core network of the cellular communications network (10); and selecting (220, 312) a PPF (16) for the protocol data unit session of the wireless device (34) based on the information indicative of the UPF (20) selected for the protocol data unit session of the wireless device (34), the PPF (16) being part of a radio access network of the cellular communications network (10).

Embodiment 2: The method of embodiment 1 further comprising: sending (222, 314), to the PPF (16), a message comprising a transport address and tunnel endpoint identifier of the UPF (20); and sending (226, 318), to a core network node (22), a message comprising a transport address and tunnel endpoint identifier of the PPF (16) to thereby enable establishment of a user plane tunnel for the protocol data unit session between the UPF (20) and the PPF (16).

Embodiment 3: The method of embodiment 1 or 2 wherein the information indicative of the UPF (20) comprises UPF pool information for the UPF (20) or UPF information for the UPF (20).

Embodiment 4: The method of any one of embodiments 1 to 3 wherein selecting (220, 312) the PPF (16) comprises selecting (220, 312) the PPF (16) for the protocol data unit session of the wireless device (34) based on the information indicative of the UPF (20) selected for the protocol data unit session of the wireless device (34) and one or more criteria associated with the radio access network.

Embodiment 5: A network node (14, 52) of a cellular communications network (10) for enabling coordinated UPF and PPF selection, the network node (14, 52) adapted to perform the method of any one of embodiments 1 to 4.

Embodiment 6: A computer program comprising instructions which, when executed on at least one processor, cause the at least one processor to carry out the method according to any one of embodiments 1 to 4.

Embodiment 7: A carrier containing the computer program of embodiment 7, wherein the carrier is one of an electronic signal, an optical signal, a radio signal, or a computer readable storage medium.

Embodiment 8: A network node (14, 52) of a cellular communications network (10) for enabling coordinated UPF and PPF selection, comprising: at least one processor (56, 74); and memory (58, 76) comprising instructions executable by the at least one processor (56, 74) whereby the network node (14, 52) is operable to perform the method of any one of embodiments 1 to 4.

Embodiment 9: A network node (14, 52) of a cellular communications network (10) for enabling coordinated UPF and PPF selection, comprising: one or more modules (82) operable to perform the method of any one of embodiments 1 to 4.

Embodiment 10: A method of operation of a network node (24, 52) of a cellular communications network (10) to enable coordinated UPF and PPF selection, comprising: selecting (210, 302) a UPF (20) for a protocol data unit session of a wireless device (34), the UPF (20) being part of a core network of the cellular communications network (10); and sending (216, 308), to another network node (22), a message comprising information indicative of the UPF (20) selected for the protocol data unit session of the wireless device (34).

Embodiment 11: The method of embodiment 10 further comprising sending (212, 304) a session establishment request to the UPF (20).

Embodiment 12: The method of embodiment 10 or 11 further comprising: receiving (228, 320), from another network node (22), a message comprising a transport address and tunnel endpoint identifier of a PPF (16) selected for the protocol data unit session of the wireless device (34), the PPF (16) being part of a radio access network of the cellular communications network (10); and sending (230, 322), to the UPF (20), a message comprising the transport address and the tunnel endpoint identifier of the PPF (16) selected for the protocol data unit session of the wireless device (34).

Embodiment 13: The method of any one of embodiments 10 to 12 wherein the information indicative of the UPF (20) comprises UPF pool information for the UPF (20) or UPF information for the UPF (20).

Embodiment 14: A network node (24, 52) of a cellular communications network (10) for enabling coordinated UPF and PPF selection, the network node (24, 52) adapted to perform the method of any one of embodiments 10 to 13.

Embodiment 15: A computer program comprising instructions which, when executed on at least one processor, cause the at least one processor to carry out the method according to any one of embodiments 10 to 13.

Embodiment 16: A carrier containing the computer program of embodiment 15, wherein the carrier is one of an electronic signal, an optical signal, a radio signal, or a computer readable storage medium.

Embodiment 17: A network node (24, 52) of a cellular communications network (10) for enabling coordinated UPF and PPF selection, comprising: at least one processor (56, 74); and memory (58, 76) comprising instructions executable by the at least one processor (56, 74) whereby the network node (24, 52) is operable to perform the method of any one of embodiments 10 to 13.

Embodiment 18: A network node (24, 52) of a cellular communications network (10) for enabling coordinated UPF and PPF selection, comprising: one or more modules (82) operable to perform the method of any one of embodiments 10 to 13.

Embodiment 19: A method of operation of network node (24, 52) of a cellular communications network (10) to enable coordinated UPF and PPF selection, comprising: receiving (414, 510) information indicative of a PPF (16) selected for a protocol data unit session of a wireless device (34), the PPF (16) being part of a radio access network of the cellular communications network (10); and selecting (416, 512) a UPF (20) for the protocol data unit session of the wireless device (34) based on the information indicative of the PPF (16) selected for the protocol data unit session of the wireless device (34), the UPF (20) being part of a core network of the cellular communications network (10).

Embodiment 20: The method of embodiment 19 further comprising: sending (418, 514), to the UPF (20), a message comprising a transport address and tunnel endpoint identifier of the PPF (16); and sending (422, 518), to a core network node (22), a message comprising a transport address and tunnel endpoint identifier of the UPF (20) to thereby enable establishment of a user plane tunnel for the protocol data unit session between the UPF (20) and the PPF (16).

Embodiment 21: The method of embodiment 19 or 20 wherein the information indicative of the PPF (16) comprises PPF pool information for the PPF (16) or PPF information for the PPF (16).

Embodiment 22: The method of any one of embodiments 19 to 21 wherein the PPF (16) is logically separated from a RCF (14), the PPF (16) is physically and logically separated from the RCF (14), or the PPF (16) is physically and logically co-located with the RCF (14).

Embodiment 23: A network node (24, 52) of a cellular communications network (10) for enabling coordinated UPF and PPF selection, the network node (24, 52) adapted to perform the method of any one of embodiments 19 to 22.

Embodiment 24: A computer program comprising instructions which, when executed on at least one processor, cause the at least one processor to carry out the method according to any one of embodiments 19 to 22.

Embodiment 25: A carrier containing the computer program of embodiment 24, wherein the carrier is one of an electronic signal, an optical signal, a radio signal, or a computer readable storage medium.

Embodiment 26: A network node (24, 52) of a cellular communications network (10) for enabling coordinated UPF and PPF selection, comprising: at least one processor (56, 74); and memory (58, 76) comprising instructions executable by the at least one processor (56, 74) whereby the network node (24, 52) is operable to perform the method of any one of embodiments 19 to 22.

Embodiment 27: A network node (24, 52) of a cellular communications network (10) for enabling coordinated UPF and PPF selection, comprising: one or more modules (82) operable to perform the method of any one of embodiments 19 to 22.

Embodiment 28: A method of operation of network node (14, 52) of a cellular communications network (10) to enable coordinated UPF and PPF selection, comprising: selecting (402, 502) a PPF (16) for a protocol data unit session of a wireless device (34), the PPF (16) being part of a core network of the cellular communications network (10); and sending (410, 508), to another network node (22), a message comprising information indicative of the PPF (16) selected for the protocol data unit session of the wireless device (34).

Embodiment 29: The method of embodiment 28 further comprising sending (404, 504) a session establishment request to the PPF (16).

Embodiment 30: The method of embodiment 28 or 29 further comprising: receiving (424, 520), from another network node (22), a message comprising a transport address and tunnel endpoint identifier of a UPF (20) selected for the protocol data unit session of the wireless device (34), the UPF (20) being part of a core network of the cellular communications network (10); and sending (426, 522), to the PPF (16), a message comprising the transport address and the tunnel endpoint identifier of the UPF (20) selected for the protocol data unit session of the wireless device (34).

Embodiment 31: The method of any one of embodiments 28 to 30 wherein the information indicative of the PPF (16) comprises PPF pool information for the PPF (16) or PPF information for the PPF (20).

Embodiment 32: The method of any one of embodiments 28 to 31 wherein the PPF (16) is logically separated from the RCF (14), the PPF (16) is physically and logically separated from the RCF (14), or the PPF (16) is physically and logically co-located with the RCF (14).

Embodiment 33: A network node (14, 52) of a cellular communications network (10) for enabling coordinated UPF and PPF selection, the network node (14, 52) adapted to perform the method of any one of embodiments 28 to 32.

Embodiment 34: A computer program comprising instructions which, when executed on at least one processor, cause the at least one processor to carry out the method according to any one of embodiments 28 to 32.

Embodiment 35: A carrier containing the computer program of embodiment 34, wherein the carrier is one of an electronic signal, an optical signal, a radio signal, or a computer readable storage medium.

Embodiment 36: A network node (14, 52) of a cellular communications network (10) for enabling coordinated UPF and PPF selection, comprising: at least one processor (56, 74); and memory (58, 76) comprising instructions executable by the at least one processor (56, 74) whereby the network node (14, 52) is operable to perform the method of any one of embodiments 28 to 32.

Embodiment 37: A network node (14, 52) of a cellular communications network (10) for enabling coordinated UPF and PPF selection, comprising: one or more modules (82) operable to perform the method of any one of embodiments 28 to 32.

The following acronyms are used throughout this disclosure.

3GPP Third Generation Partnership Project
5G Fifth Generation
5GC Fifth Generation Core Network
AMF Access and Mobility Management Function
ASIC Application Specific Integrated Circuit
AUSF Authentication Server Function
CN Core Network
CP Control Plane
CPU Central Processing Unit
CU Central Unit
CU-CP Central Unit-Control Plane
CU-UP Central Unit-User Plane
DSP Digital Signal Processor
FPGA Field Programmable Gate Array
FQDN Fully Qualified Domain Name
gNB New Radio Base Station
IP Internet Protocol
LTE Long Term Evolution
MME Mobility Management Entity
MTC Machine Type Communication
NG Next Generation
NGC Next Generation Core Network
NR New Radio
PCF Policy Control Function
PDN Packet Data Network
PDU Protocol Data Unit
P-GW Packet Data Network Gateway
PPF Packet Processing Function
RAN Radio Access Network
RAT Radio Access Technology
RCF Radio Control Function
SCEF Service Capability Exposure Function
S-GW Serving Gateway
SMF Session Management Function
TEID Tunnel Endpoint Identifier
UDM User/Unified Data Management
UE User Equipment
UP User Plane UPF User Plane Function Those skilled in the art will recognize improvements and modifications to the embodiments of the present disclosure. All such improvements and modifications are considered within the scope of the concepts disclosed herein.

What is claimed is:

1. A method of operation of network node of a cellular communications network to enable coordinated User Plane Function, UPF, and Packet Processing Function, PPF, selection, comprising:
at a Radio Control Function, RCF:
receiving, from an Access and Mobility Management Function, AMF, information indicative of a UPF selected for a protocol data unit session of a wireless device, the UPF being part of a core network of the cellular communications network; and
selecting a PPF for the protocol data unit session of the wireless device based on the information indicative of the UPF selected for the protocol data unit session of the wireless device and one or more criteria associated with a radio access network of the cellular communications network, the PPF being part of the radio access network of the cellular communications network.

2. The method of claim 1 wherein the information indicative of the UPF comprises UPF pool information for the UPF or UPF information for the UPF.

3. The method of claim 1 wherein the information indicative of the UPF comprises information that identifies a name or location of the UPF.

4. The method of claim 1 wherein the information indicative of the UPF comprises a UPF pool identity for the UPF, a UPF name of the UPF, a UPF address of the UPF, or a UPF location of the UPF.

5. The method of claim 1 wherein selecting the PPF comprises selecting the PPF for the protocol data unit session of the wireless device based on the information indicative of the UPF selected for the protocol data unit session of the wireless device and a defined mapping of the information that identifies the UPF selected for the protocol data unit session of the wireless device to one or more available PPFs including the PPF.

6. The method of claim 1 wherein selecting the PPF comprises selecting the PPF for the protocol data unit session of the wireless device by locally translating the information indicative of the UPF selected for the protocol data unit session of the wireless device to the PPF based on a defined mapping of the information that identifies the UPF selected for the protocol data unit session of the wireless device to one or more available PPFs including the PPF.

7. The method of claim 1 wherein selecting the PPF comprises selecting the PPF for the protocol data unit session of the wireless device by querying a separate database using the information indicative of the UPF selected for the protocol data unit session of the wireless device to thereby translate the information indicative of the UPF selected for the protocol data unit session of the wireless device to the PPF based on a defined mapping.

8. The method of claim 1 further comprising:
sending, to the PPF, a message comprising a transport address and tunnel endpoint identifier of the UPF; and
sending, to a core network node, a message comprising a transport address and tunnel endpoint identifier of the PPF to thereby enable establishment of a user plane tunnel for the protocol data unit session between the UPF and the PPF.

9. The method of claim 1 wherein receiving the information indicative of the UPF selected for the protocol data unit session of the wireless device and selecting the PPF for the protocol data unit session of the wireless device based on the information indicative of the UPF selected for the protocol data unit session of the wireless device are performed during an initial attachment procedure.

10. The method of claim 9 wherein:
receiving the information indicative of the UPF selected for the protocol data unit session of the wireless device comprises receiving an initial context setup request comprising the information indicative of the UPF, a transport address of the UPF, and a tunnel endpoint identifier of the UPF; and
the method further comprises:
sending, to the PPF, an initial User Equipment, UE, attach message comprising the transport address and the tunnel endpoint identifier of the UPF; and
sending, to the AMF, an initial context setup response comprising a transport address and tunnel endpoint identifier of the PPF to thereby enable establishment of a user plane tunnel for the protocol data unit session between the UPF and the PPF.

11. The method of claim 1 wherein receiving the information indicative of the UPF selected for the protocol data unit session of the wireless device and selecting the PPF for the protocol data unit session of the wireless device based on the information indicative of the UPF selected for the protocol data unit session of the wireless device are performed during a reselection or reallocation procedure.

12. The method of claim 11 wherein:
receiving the information indicative of the UPF selected for the protocol data unit session of the wireless device comprises receiving an initial context modification request comprising the information indicative of the UPF, a transport address of the UPF, and a tunnel endpoint identifier of the UPF; and
the method further comprises:
sending, to the PPF, an establishment request comprising the transport address and the tunnel endpoint identifier of the UPF; and
sending, to the AMF, a context modification response comprising a transport address and tunnel endpoint identifier of the PPF to thereby enable establishment of a user plane tunnel for the protocol data unit session between the UPF and the PPF.

13. The method of claim 1 wherein the PPF is logically separated from the RCF, the PPF is physically and logically separated from the RCF, or the PPF is physically and logically co-located with the RCF.

14. A network node of a cellular communications network for enabling coordinated User Plane Function, UPF, and Packet Processing Function, PPF, selection, comprising:
a Radio Control Function, RCF, comprising:
at least one processor; and
memory comprising instructions executable by the at least one processor whereby the network node is operable to:
receive, from an Access and Mobility Management Function, AMF, information indicative of a UPF selected for a protocol data unit session of a wireless device, the UPF being part of a core network of the cellular communications network; and
select a PPF for the protocol data unit session of the wireless device based on the information indicative of the UPF selected for the protocol data unit session of the wireless device and one or more criteria associated with a radio access network of the cellular communications network, the PPF being part of the radio access network of the cellular communications network.

\* \* \* \* \*